United States Patent
Parker et al.

(10) Patent No.: US 7,277,901 B2
(45) Date of Patent: Oct. 2, 2007

(54) COLLABORATIVE FILE UPDATE SYSTEM

(75) Inventors: James A. Parker, Phoenix, AZ (US); James M. Sparks, Phoenix, AZ (US)

(73) Assignee: Tacit Networks, Inc., South Plainfield, NJ (US)

(*) Notice: Subject to any disclaimer, the term of this patent is extended or adjusted under 35 U.S.C. 154(b) by 356 days.

(21) Appl. No.: 10/699,065

(22) Filed: Oct. 31, 2003

(65) Prior Publication Data
US 2005/0010607 A1 Jan. 13, 2005

Related U.S. Application Data

(60) Provisional application No. 60/486,708, filed on Jul. 10, 2003.

(51) Int. Cl.
*G06F 17/30* (2006.01)
(52) U.S. Cl. .................. 707/203; 707/200; 707/204
(58) Field of Classification Search ............ 707/200, 707/203, 202, 204; 709/203, 206, 218, 219
See application file for complete search history.

(56) References Cited

U.S. PATENT DOCUMENTS

| | | | | |
|---|---|---|---|---|
| 5,418,908 A | | 5/1995 | Keller et al. ............. 395/200 |
| 5,475,753 A | * | 12/1995 | Barbara et al. ............ 713/187 |
| 5,689,560 A | | 11/1997 | Cooper et al. ............... 380/4 |
| 5,771,355 A | | 6/1998 | Kuzma ................. 395/200.62 |
| 5,781,901 A | | 7/1998 | Kuzma ....................... 707/10 |
| 5,790,793 A | | 8/1998 | Higley .................. 395/200.48 |
| 5,815,663 A | | 9/1998 | Uomini ................. 395/200.49 |
| 5,903,723 A | | 5/1999 | Beck et al. ............... 395/200.3 |
| 5,923,845 A | | 7/1999 | Kamiya et al. ......... 395/200.36 |
| 5,923,846 A | | 7/1999 | Gage et al. ............ 395/200.43 |
| 5,941,946 A | | 8/1999 | Baldwin et al. ............. 709/206 |

(Continued)

FOREIGN PATENT DOCUMENTS

EP 1 058 199 12/2000

(Continued)

OTHER PUBLICATIONS

Shirmohammadi et al. An architecture fro collaboration in virtual invironments, p. 283, date: Mar. 18-22, 2000.□□.*

(Continued)

*Primary Examiner*—John Breene
*Assistant Examiner*—Baoquoc N. To
(74) *Attorney, Agent, or Firm*—Mark J. Spolyar

(57) ABSTRACT

In a disclosed method that facilitates collaborative file updating, data is accepted from one of a plurality of users and stored. The data represents an initial version of the file and designates one or more recipients of the initial version. Then, for each one of sequentially updated versions of the file, data representing a difference between the updated version of the file and an immediately previous version of the file is accepted from a user. The data also designates one or more recipients of the updated version. Data representative of the updated version of the file is transmitted to the designated recipients of the updated version. The data transmitted to each recipient who is designated as a recipient of the updated version and who accessed the immediately previous version consists substantially of the difference between the updated and previous versions of the file. Other methods and systems are disclosed.

29 Claims, 19 Drawing Sheets

U.S. PATENT DOCUMENTS

| | | | |
|---|---|---|---|
| 6,009,462 | A | 12/1999 | Birrell et al. ............... 709/206 |
| 6,018,761 | A | 1/2000 | Uomini ....................... 709/206 |
| 6,026,410 | A * | 2/2000 | Allen et al. .............. 707/104.1 |
| 6,052,735 | A | 4/2000 | Ulrich et al. ............... 709/236 |
| 6,088,702 | A | 7/2000 | Plantz et al. ............... 707/103 |
| 6,145,012 | A | 11/2000 | Small ........................ 709/246 |
| 6,393,437 | B1 | 5/2002 | Zinda et al. ................ 707/201 |
| 6,397,261 | B1 | 5/2002 | Eldridge et al. ............ 709/299 |
| 6,489,980 | B1 * | 12/2002 | Scott et al. ................. 715/854 |
| 6,687,741 | B1 * | 2/2004 | Ramaley et al. ............ 709/206 |
| 6,912,591 | B2 * | 6/2005 | Lash .......................... 709/246 |
| 7,209,953 | B2 * | 4/2007 | Brooks ....................... 709/206 |
| 2002/0019851 | A1 | 2/2002 | Pollack ....................... 709/206 |

FOREIGN PATENT DOCUMENTS

| | | |
|---|---|---|
| WO | WO98/58332 | 12/1998 |
| WO | WO 98/58332 | 12/1998 |
| WO | WO 00/45321 | 8/2000 |
| WO | WO 00/60503 | 10/2000 |
| WO | WO 00/67119 | 11/2000 |
| WO | WO 00/67119 A3 | 11/2000 |
| WO | WO 01/16804 A2 | 3/2001 |
| WO | WO 01/97089 | 12/2001 |
| WO | WO 02/47351 | 6/2002 |

OTHER PUBLICATIONS

Shen et al. Flexible notification for collaborative systems. pp. 77-86, date 2002.*

"An Easy-To-Use System for Document Collaboration", Internet World, Feb. 1999.

"Bringing Remote and Mobile Workforce Backup and Data Retrieval to the Enterprise", white paper dated Sep. 1998.

"Calypso E-Mail Quick Reference", Web page printed Nov. 2000, http://mcsdallas.com/mcs/calypso/quickrefMain.htm (pp. 1, 20 of 23 only).

"Notes on Keeping Version Histories of files," Web page printed Jan. 9, 2003 from http://web.mit.edu/ghudson/thoughts/file-versioning.

B. Magnusson and U. Asklund, "Fine Grained Version Control of Configurations in COOP/Orm," also in Proc. Symposium on Conf. Mgmt., Mar. 1996.

Endymion Corp., "Frequently Asked Questions for MailMan Version 3.0," Web page dated May 2000, http://www.endymion.com/products/mailman/mmfaq.htm.

J. Estublier et al., "Impact of the Research Community on Field of Software Configuration Management," copy undated.

J. MacDonald, "File System Support for Delta Compression," copy undated.

J. MacDonald et al., "PRCS: The Project Revision Control System," copy undated.

J. Symoens, "ServerMax extends disk space", InfoWorld, Mar. 1998.

K. Schultz, "Remote Backup: CoreDate Remote Worx 2.1", TechWeb review, Oct. 1998.

R. Burns and D. Lond, "Efficient Distributed Backup with Delta Compression," copy undated.

T. Christensen and J. Schindler, "Ganesh—holistic Version Control in a Structure Based Environment," report labeled as published Dec. 1998.

Tumbleweed Communications, "E-mail Vulnerability Not a Problem for Online Deliveries with Tumbleweed Posta," press release dated Jul. 1998.

* cited by examiner

FIG. 4

```
TO:     bob@company.com; charles@company.com  ~468        412
CC:     consultant@university.edu  ~466                   414      400
BCC:    alice@company.com                                 416
Viewer: alice@company.com  ~464                           424
Editor: bob@company.com; charles@company.com  ~462        426
                                    TO:
File:   Widget Design Spec.rtf      CC:                   430
        Subject:              464~  BCC:
        Proposed Widget Design Spec                       412

Bob and Charles,

Please edit the attached design specification for the new Widget. I'll check out your edits
        later this week. I've copied our consultant in case she has any comments for us.

- Jim                                                       450
```

FIG. 5

```
                                     522  524  526
TO:     bob@company.com; charles@company.com  512   O⊙O  alice@company.com
CC:     consultant@university.edu             514   OO⊙  bob@company.com
BCC:    alice@company.com                     516   OO⊙  charles@company.com
File:   Widget Design Spec.rtf                530   ⊙OO  consultant@university.edu
                                                         └─EDITOR
500    Subject:                                          └──VIEWER     520
       Proposed Widget Design Spec            540

Bob and Charles,

Please edit the attached design specification for the new Widget. I'll check out your edits
       later this week. I've copied our consultant in case she has any comments for us.

- Jim                                                        550
```

COLLABORATIVE FILE UPDATE SYSTEM

CROSS REFERENCE TO RELATED APPLICATIONS

This application claims the benefit of co-pending U.S. provisional application Ser. No. 60/486,708 entitled "Collaborative File Update System" and filed Jul. 10, 2003, incorporated herein by reference.

BACKGROUND OF THE INVENTION

Colleagues in workgroups increasingly rely on electronic messaging to exchange and collaborate on electronic files. With the increased use of the Internet to connect remote participants in workgroups, colleagues often find themselves unable to reach a common point at which they can safely and conveniently store and access shared files. Even where such access is possible (e.g., within a local area network or via an Internet-based virtual private network), workgroup participants often gravitate to the convenience and familiar interface of electronic mail and wind up passing files back and forth as electronic mail (e-mail) attachments.

Collaborative access to electronic files via e-mail attachments can be inefficient for a number of reasons. Transmission of files as attachments consumes significant network resources. This problem is worsened due to the inefficient base-64 encoding that e-mail systems conventionally employ. Recipients of electronic mail messages with large attachments may become annoyed at lengthy download times when checking their e-mail, particularly when connecting over slower telephone lines. Many users would prefer to access shared files when and if they wish, rather than having files "pushed" into their e-mail in-boxes.

In a collaborative workgroup, managing access and version control of shared files can pose an even more significant problem for simple attachment-based file sharing. After sending a version of a file to a colleague via e-mail attachment, a file originator or author loses control of edits made to that version by the colleague. Implementing such edits in the "official" version of the file requires the file originator to overwrite the original file with an edited version sent back to the originator via another e-mail attachment. Implementing edits made by multiple colleagues requires the originator to merge edits manually.

PCT Patent application No. WO 00/60503 by Serbinis et al. discloses a document-management system in which a file originator uploads a file to a document management system store and lists users authorized to access the document. Nonetheless, there remains a need to more seamlessly integrate document management with e-mail systems, to promote convenience and to help discourage users from falling back on the familiar but inefficient system of sending files by attachment. Better e-mail/document integration would provide the convenience and familiar interface of sending files as attachments while maintaining the benefits of network access to shared files.

SUMMARY OF THE INVENTION

In a method according to various aspects of the present invention for facilitating collaborative updating of a file, data is accepted from one of a plurality of users and stored. The data represents an initial version of the file and designates one or more recipients of the initial version.

Then, for each one of a plurality of sequentially updated versions of the file, data is accepted from one of the plurality of users. The data is representative of a difference between the updated version of the file and an immediately previous version of the file. The data also designates one or more recipients of the updated version. Data representative of the updated version of the file is transmitted to the designated recipients of the updated version.

According to a particular aspect of the invention, a server accessible to all the users accepts the data. Advantageously, the users can exchange references to file revisions which, when activated by a designated recipient, cause the server to transmit data representative of an original or updated version of the file, thus avoiding the need for file transfer directly between the users.

The data transmitted to each recipient designated as a recipient of the updated version and having accessed the immediately previous version consists substantially of the difference between the updated version of the file and the previous version of the file. Thus, users who are capable of obtaining an updated file version merely by patching an immediately previous version with a delta file receive only that delta file. The entire file as updated need not be transmitted in such cases.

According to another particular aspect of the invention, users designated as recipients of the updated version but not the immediately previous version receive data of the updated file itself rather than a delta from any previous version. The file is updated before transmission, and the complexity of transmitting multiple deltas for updating after transmission is avoided.

The above summary does not include an exhaustive list of all aspects of the present invention. Indeed, the inventors contemplate that the invention includes all systems and methods that can be practiced from all suitable combinations of the various aspects summarized above, as well as those disclosed in the detailed description below and particularly pointed out in the claims filed with the application. Such combinations have particular advantages not specifically recited in the above summary.

BRIEF DESCRIPTION OF THE DRAWINGS

FIGS. 4 and 5 depict two exemplary electronic message windows according to various aspects of the invention.

FIG. 6, including two partial views labeled

DESCRIPTION OF PREFERRED EXEMPLARY EMBODIMENTS

Figure 1:
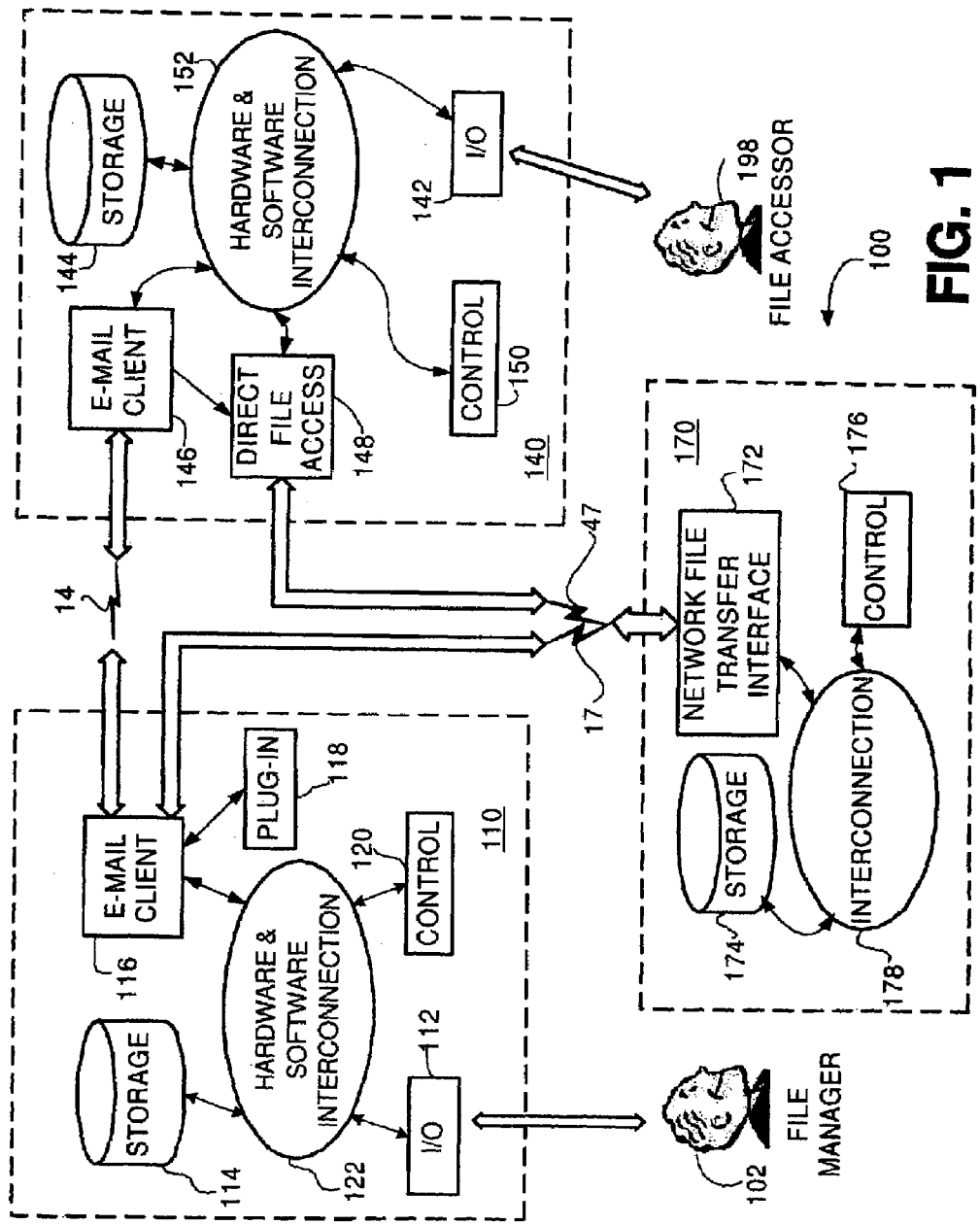
FIG. 1 is a schematic block diagram of an electronic file access system according to various aspects of the present invention.

An electronic mail file access system according to various aspects of the present invention provides numerous benefits, including convenience of access management arising from the use of novel extensions to the familiar user interface employed by typical e-mail software. Such a system suitably includes any group of hardware or software components that can interact to facilitate file access via electronic messaging. For example, system 100 of FIG. 1 includes a first computer 110, a second computer 140, and a third "access server" computer 170, suitably networked together via conventional network connections 14, 17, and 47.

FIG. 1 schematically depicts computers 110, 140, and 170 as dashed boxes, and schematically depicts functional modules that those computers implement in system 100 as schematic symbols within each respective computer's dashed box. These functional modules can be suitably implemented by hardware, software, or both. Functional modules can interact via any suitable routes of interconnection, including hardware (e.g., a bus, dedicated signal lines, etc.), access to shared storage media (e.g., arguments and returned values of function calls in RAM media, dual-access RAM, files residing on hard disk media, etc.), and combinations of hardware and shared media access.

Computer 110 implements functional modules including I/O (input/output) module 112, storage 114, and an e-mail client application 116 modified by a plug-in 118. Control module 120, manages operation of these modules and any others that computer 110 implements. Hardware and software interconnection module 122 represents interconnection between the various modules of computer 110.

Computer 140 implements functional modules including I/O 142, storage 144, an e-mail client application 146 and a direct file access module 148. Control module 150 manages operation of these modules and any others that computer 140 implements. Interconnection between the various modules of computer 140 is represented by hardware and software interconnection module 152.

Access server 170 implements functional modules to provide network access to files in a storage module 174. Server 170 includes, in addition to storage 174, a network file transfer interface module 172 and a control module 176. Interconnection module 178 represents hardware and software interconnection between the various modules of computer 170.

An I/O functional module according to various aspects of the invention includes any hardware or software that accepts input from a user and conveys output to the user. In system 100, the user of computer 110 is a person 102 acting as a file manager, and the user of computer 140 is a person 198 acting as a file accessor. I/O module 112 of computer 110 accepts conventional user input (e.g., mouse and keyboard input, voice dictation and commands) from file manager 102, who directs operation of computer 110. I/O module 112 conveys output from computer 110 to file manager 102 via conventional output devices (e.g., an LCD or CRT monitor, speakers) not shown in FIG. 1. Similarly, I/O module 142 of computer 140 accepts input from, and conveys output to, file accessor 198. Although computer users appear as humans at the computers, the invention allows for persons not present at the computers at all times, or "present" only through remote links. Also, the person can be replaced with artificial intelligence systems or robots.

Exemplary storage modules 114, 144, and 174 of computers 110 and 140 and access server 170 conventionally include hard disk storage, RAM, and boot ROM. A storage functional module according to various aspects of the invention can include, in addition to the hardware and software employed in modules 114 and 144, any hardware and associated software that suitably stores data. Storage may be temporary or permanent, in volatile or nonvolatile media.

Control modules 120, 150, and 176 of computers 110 and 140 and access server 170 conventionally include one or more central processing unit (CPU) integrated circuits with embedded microcode, boot software (e.g., in a BIOS chip), and a suitable software operating system, e.g., Linux, BeOS, MacOS, WINDOWS, etc. (A control module according to various aspects of the invention can include this exemplary hardware and software or any other that controls operation of a computer.) Once the software operating system takes control of the CPU, it manages interaction of other components in the CPU's computer. For example, control module 120, manages the exchange of data between I/O module 112, a hard disk and memory in storage module 114, and application function calls implementing e-mail client module 116 and plug-in module 118, the exchange being represented by hardware and software interconnection module 122.

An e-mail client module according to various aspects of the invention includes any functional module implemented by any suitable hardware and software combination that permits a user to exchange electronic messages with another user via a network connection. When suitably modified for purposes of implementing aspects of the invention by plug-in module 118, exemplary e-mail client module 116 can be a conventional e-mail client application and still perform functions (discussed below) in system 100. Suitable e-mail client applications include NOTES (Lotus/IBM), EUDORA (Qualcomm), MESSENGER (Netscape), and OUTLOOK (Microsoft). Alternatively, such function can be integrated into application module 116, in which case plug-in module 118 may be omitted.

E-mail client module 146 of computer 140 need not be specially coded or modified by a plug-in module to perform its functions in system 100. Exemplary computer 140 includes direct file access module 148 (preferably launched as an e-mail attachment) to perform such functions. In variations where the benefits of a direct file access module are not required, a file accessor can just employ a conventional e-mail client. In such variations, direct file access can be initiated by selection of a hyper-link embedded in an e-mail message, avoiding the need for a direct file access module. In other variations, a file accessor can employ a specially coded electronic mail client or one modified by a plug-in. Accordingly, a system according to various aspects of the invention can operate without retrofitting all e-mail software for file accessors.

Code residing within a single dynamic-linked library (DLL) file can implement plug-in module 118, at least within the EUDORA e-mail client in variations employing that client. An installation program can store the DLL file in a "plugins" folder (e.g., "C:\Program Files\Eudora\plugins") on a hard disk of storage module 114. Other e-mail clients implement plug-ins in different ways.

Figure 2:
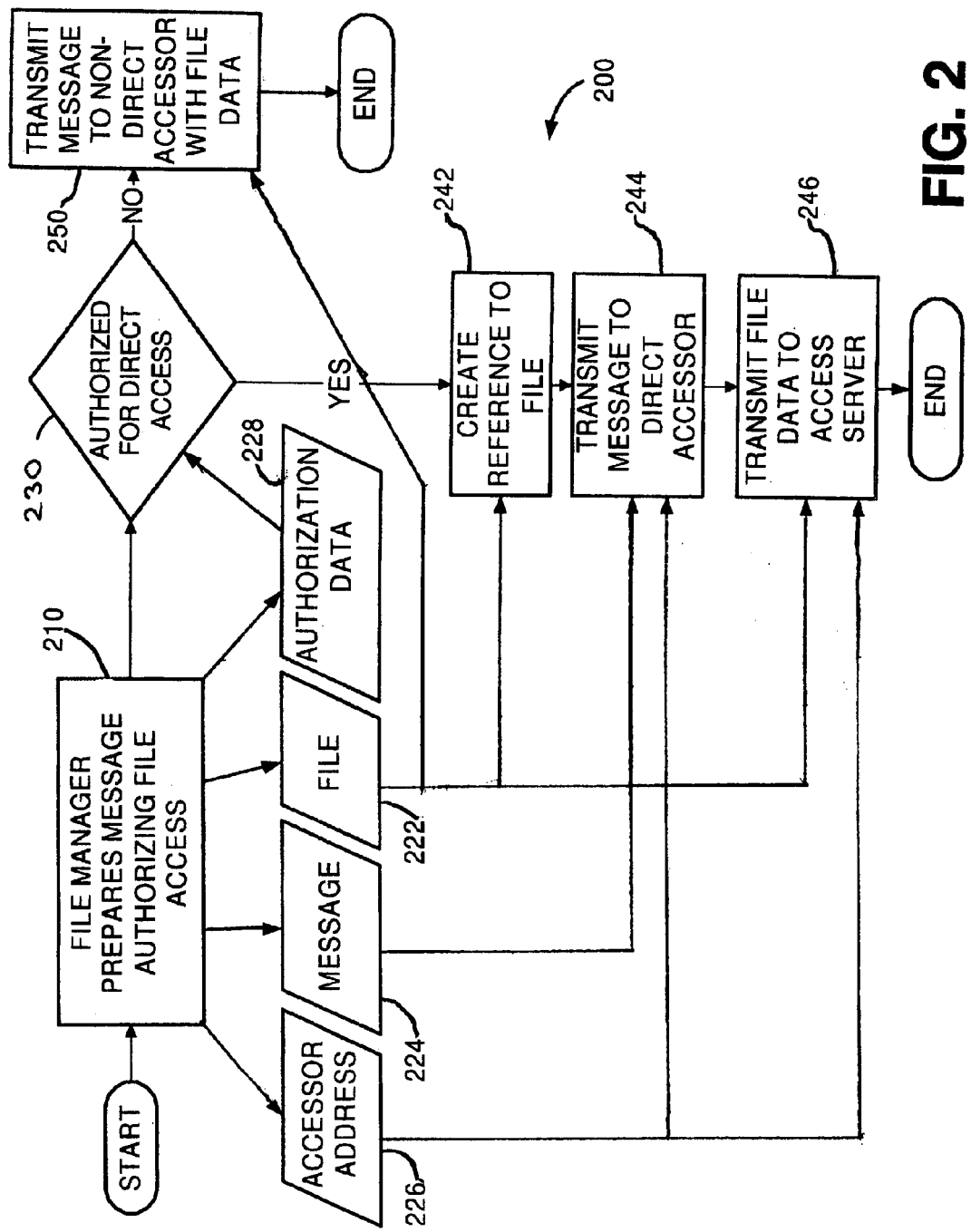
FIG. 2 is a data flow diagram of a method for transmitting file data in the system of FIG. 1.

An exemplary method 200 for message and file transmission in system 100 may be better understood with additional reference to the data flow diagram of FIG. 2. This example illustrates benefits of various aspects of the invention when such aspects are employed in the exemplary configuration of system 100. However, certain aspects can provide benefits even when various other aspects are omitted. Thus, neither this nor any other example provided herein should be considered as limiting the scope of the invention in any way; that limiting function is reserved exclusively for the issued claims.

In process 210 of method 200, the file manager (not shown in FIG. 2) prepares a message authorizing file access. To do so, file manager 102 interacts with computer 110 via input and output communicated through I/O module 112. (See FIG. 1.) The file manager identifies a file 222 (resident on a hard disk or other media of storage 114 of FIG. 1) to which he or she wishes to authorize access by a file accessor. The file manager typically is the author of files to which he or she grants access, though this need not be the case.

The file manager identifies an electronic message address 226 of the file accessor. With functional modifications from plug-in module 118, module 116 (FIG. 1) further records indicia of whether file accessor 198 is a viewer authorized to view the file or an editor authorized to modify the file. (Naturally, authorization to modify a file implies concurrent authorization to view it.)

In conventional electronic mail systems, an electronic message address includes a user's ID followed by the "@" symbol, which is followed by a network domain name of the user. For example, the address "tom_edison@lightbulbs.com" includes the user ID "tom_edison" and the domain name "lightbulbs.com". Given a compatible infrastructure, other types of electronic message addresses can be employed.

Method 200 continues with process 230, which determines authorization status of the file accessor. Process 230 (which computer 110, access server computer 170, or perhaps computer 140 of FIG. 1 can execute), relies on authorization data 228 to make this determination. Authorization data 228 can be automatically determined or the file manager can supply it manually. Exemplary systems and methods for manual determination of authorization data are discussed below with reference to FIGS. 4-5.

Authorization data for a given file accessor can be automatically determined based on the electronic message address associated with the file accessor, using any suitable technique. In system 100 of FIG. 1, for example, an authorization database module (not shown, but which may be located on storage 114) in computer 110 maintains a database of authorized accessors and authorization status for each. The authorization database module can look up the address of file accessor 198 and, if a match is found, update authorization data 228 (FIG. 2) to identify accessor 198 as a viewer or editor with direct access authorization or as an accessor with no direct access authorization.

In addition or alternatively, system 100 can automatically determine authorization data based on the user ID or domain name of file accessor 198. For example, all addresses having the same corporate domain name as the address of file manager 102 may be associated with data authorizing direct file access. As another example, all addresses having the domain name of commonly known free e-mail services may be associated, out of security concerns, with data that blocks authorization of direct file access. In a variation where both automatic and manual authorization determination are employed in combination, such blocking can be assigned a higher priority to override any user authorization.

Exemplary method 200 (FIG. 2) continues with either process 250 or processes 242, 244, and 246, depending on the authorization status determined at process 230. If accessor address 226 is not authorized for direct access to file 222, process 250 conventionally transmits a copy of file 222 as an attachment to message 224. If address 226 is authorized for direct file access, however, process 242 creates a reference to file 222. Process 244 then transmits message 222 to the file accessor with the reference attached to message 222 or integrated into it. Process 246 then transmits data of file 222 to access server 170 via network connection 17 (see FIG. 1).

In variations of system 100 (FIG. 1), computer 110 can send file references instead of file attachments when direct file access is requested. Computer 110 can do so even with an entirely unmodified e-mail client module or one that is only modified to include viewer and editor fields. In such variations, computer 110 can implement an additional module (not shown) that detects API calls for attachment of a file to an e-mail message. If direct file access is requested, such a module can trick e-mail client module 116 into instead attaching a file of executable code that references the desired file. Alternatively, computer 110 can implement a firewall-type module (also not shown) that detects the presence of a file attachment in a message, just before transmission via network connection 14. The firewall-type module can replace file attachments with file references and transmit data of the formerly attached file to access server 170 via network connection 17.

In system 100 and method 200 of FIGS. 1-2, access server 170 receives data of file 222 through network file transfer interface 172. Server 170 stores the data in storage 174, from which file accessor 198 can eventually obtain it to view or edit file 222, depending on his or her level of authorization. In variations where the benefits of an access server according to various aspects of the invention are not required, it can be omitted. In such a variation of system 100, as an example, computer 140 can connect to computer 110 via network connection 14 for direct file access, omitting server 170.

A file reference according to various aspects of the invention includes any indicia identifying a location of a file. A file reference can be a hyperlink. In that case, it includes both human-readable indicia (e.g., a file name) and associated machine-readable indicia (e.g., a network address from which the file can be retrieved). In one variation, a file reference can consist of just text identifying a network address, which a file accessor can enter into a suitable field (e.g., an address field of a Web browser) to retrieve the file.

In a particularly advantageous variation, a file reference can be a message attachment that includes code implementing a direct file access module, e.g., module 148 of system 100. A direct file access module according to various aspects of the invention includes any functional module implemented by any suitable hardware and software combination that facilitates direct file access. Advantageously, sending code to a file accessor that implements a direct file access module dispenses with the need for direct file access capability in that person's e-mail client. U.S. Pat. No. 6,014,688 to Venkatraman et al. contains disclosure that may be helpful in implementing this variation.

A file reference can include data representing a plausibly unique identification code that is associated with the referenced file, as well as other codes. A plausibly unique identification code according to various aspects of the invention is a sequence of digits, of any type and generated by any suitable technique, that (1) is associated with a specific document, document revision, server, user, or other identifiable entity and (2) is unlikely, to a desired degree of statistical certainty, to be associated with any other such entity.

For example, a file reference can include four plausibly unique identification codes, each associated with, respectively, (1) an access server on which the referenced file resides, (2) the referenced file itself, (3) the transmitting user, and (4) the file's present revision. Advantageously, a recipient of such a file reference can access the file from a specifically identified access server in a multiple-server system without needing to poll multiple servers or infer which of several servers might be housing the desired file. In a variation where this and other benefits of a multiple-code file reference are not required, a single code identifying the file can be employed.

The use of multiple access servers provides particular advantages. Where users are clustered geographically, for example, users within each of several widely separated clusters can be assigned an access server proximate that cluster. Each user is allowed to transmit files only the assigned access server and the recipient can either receive an identification of the access server with the file reference, as discussed above, or infer which of the several access servers houses the file by looking up the transmitting user in a roster of users and their permitted "write" servers. Multiple access servers can also be employed in a single location, allowing load distribution between several computers, and selected randomly or by some predetermined selection scheme.

To enhance security by ensuring that only persons granted a specific level of authorization are able to exercise that authorization, a file reference is preferably encrypted or passed through a one-way cryptographic function. Encrypting the reference, either to a public key of a designated accessor or with a shared secret key known only to the accessor and the file manager, can prevent persons other than the designated accessor from using the file reference. Passing the file reference through a one-way cryptographic function (e.g., including a user ID, a file ID, and a time ID at the input) can prevent interlopers from discerning the name of the file based on its reference. Variations that do not encrypt the reference preferably employ alternative access control measures such as requiring a password or passphrase or only permitting SSL connections to authorized network addresses.

U.S. patent application Ser. No. 08/877,065, filed Jun. 17, 1997, and Ser. No. 09/092,132, filed Jun. 5, 1998, listed as priority documents in PCT application WO 98/58332 published Dec. 23, 1998, contain disclosure that may be helpful in enhancing security of file references.

When operating in accordance with method 200 of FIG. 2, e-mail client module 116 in computer 110 (FIG. 1) transmits message 224 to e-mail client module 146 in computer 140, under control of file manager 102. With direct file access authorization, file accessor 198 can then access file 222 (FIG. 2) separately from message 224. Accessor 198 of file 222 and any other authorized accessors can obtain and (if authorized as editors) modify data of file 222 via access server 170. This regulated and usually bandwidth-intense file access occurs over network connection 47, separately from network connection 14 between computers 110 and 140. Thus, network connection 14 can be realized with a low-bandwidth and sporadic connection without affecting quality of access to file 222, once it has been stored in access server 170.

Any suitable connection equipment and communication protocols can be employed to implement network connections 14, 17, and 47. Examples of suitable connections include twisted-pair cable, fiber-optic cable, spread-spectrum wireless (infrared or RF), RF satellite relay, and audio-modulated telephone connections. Examples of suitable communication protocols at various layers include ATM, TCP/IP, HTTP, FTP, NetBEUI, and symmetric or public key encryption. Typical implementations of system 100 employ multiple types of connections and protocols, especially when network connections 14, 17, and 47 span a wide-area, platform-independent network such as the Internet.

In a particularly advantageous variation of system 100, computer 110 can transmit electronic message 224 to computer 140 under low-bandwidth or otherwise non-ideal conditions while deferring transmission of file 222 to access server 170. Such a system monitors the condition of network connection 17 and transmits file 222 when connection 17 improves to a suitable quality level. The quality level is preferably determined based on speed, but can also account for interruption frequency.

Deferral of file transmission can be analyzed by any suitable technique using any suitable standards. In an exemplary technique, computer 110 determine conditions of that connection by analyzing packets sent across network connection 14 during transmission of a message sent to a file accessor. If the timing of the packet transmission indicates (by the predetermined standard) that connection 17 has unsuitable quality for transmission of a file "attached" by reference, computer 110 defers that transmission until conditions improve. Computer 110 can also periodically monitor conditions by analyzing packets sent during transmission of electronic messages other than the one to which the file is attached or during retrieval of Internet Web pages. One of many possible alternatives to this technique is for computer 110 to check for whether it has a local area network connection or a modem connection active and to defer file transmission until the local area network connection becomes active. Another alternative (based on transmission latency) is "pinging" access server 170 and determining transit times.

U.S. patent application Ser. No.: 60/065,533 filed Nov. 13, 1997; Ser. No. 60/085,427 filed May 14, 1998; and Ser. No. 60/100,962 filed Sep. 17, 1998, listed as priority documents in PCT application WO 99/26121 published May 27, 1999, contain disclosure that may be helpful in implementing deferred file transmission.

Figure 6A:
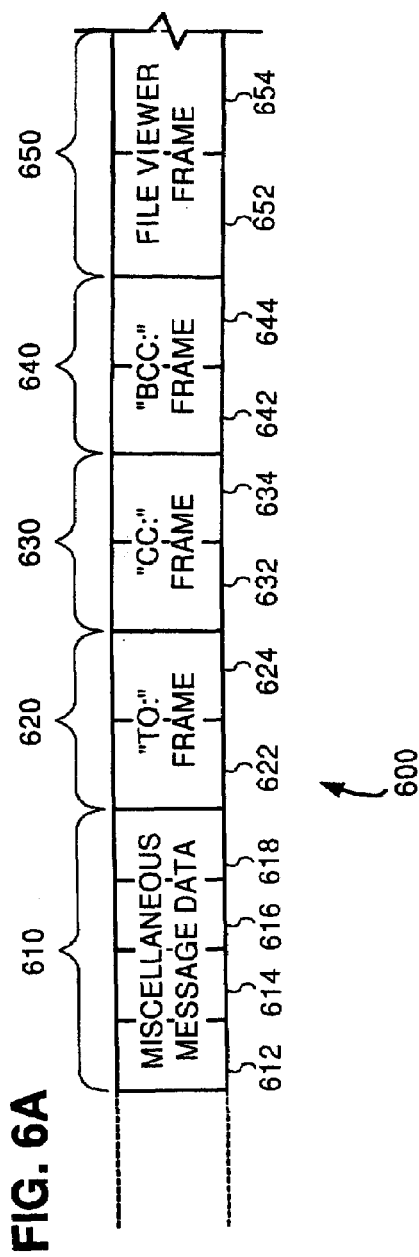
FIG. 6A and FIG. 6B, depicts a propagated signal embodied in a message-encoded data stream according to various aspects of the invention.
Figure 6B:
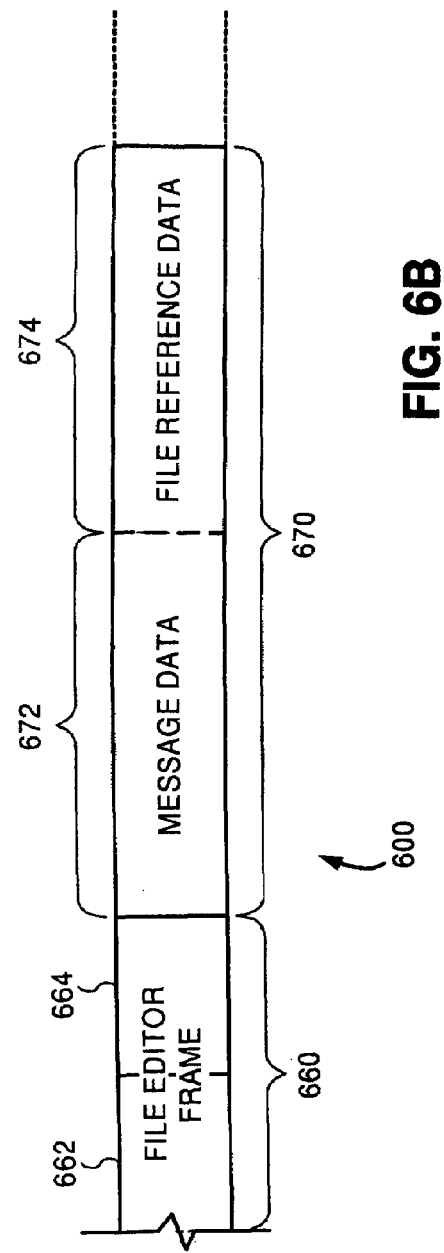

An exemplary signal for transmission of an electronic message according to various aspects of the invention may be better understood with reference to FIG. 6. Propagated signal 600, which begins in the view of FIG. 6A and ends in the view of FIG. 6B, includes a series of data frames. Any suitable type of signal having a series of data frames (in parallel or serial format, in contiguous sequence or interspersed with unrelated data) can be employed.

Frame 610, which includes subframes 612-618, includes miscellaneous message data that identifies the message and permits conventional systems to process it using an established message transmission protocol, e.g., MIME.

Frames 620-660 each include two subframes. Subframes 622, 632, 642, 652, and 662 include headers identifying each frame's contents. Subframes 624, 634, 644, 654, and 664 include respective sets of indicia (e.g., ASCII text of e-mail addresses) associated with each respective header. Some of frames 620-660 may be left blank, containing only a header identifying the frame.

Frames 620, 630, and 640 are message recipient frames. These frames can convey one or more addresses of message recipients who have been identified in conventional fields (here, "TO:", "CC:" and "BCC:" fields) of a message window. Frames 650 and 660 can convey one or more addresses of message recipients who have been identified as viewers or editors authorized for direct viewing or editing access to a file referenced in the message, respectively.

Frame 670, which includes subframes 672 and 674, conveys the actual information of the message. For messages sent with attached files (e.g., to persons not authorized for direct file access), subframe 674 can includes actual data of the attachment. As depicted in FIG. 6B, however, message signal 600 includes data 674 referencing the file. As discussed above, this reference data can include, for example, code that implements a direct file access module when executed or a hyperlink.

Figure 3:
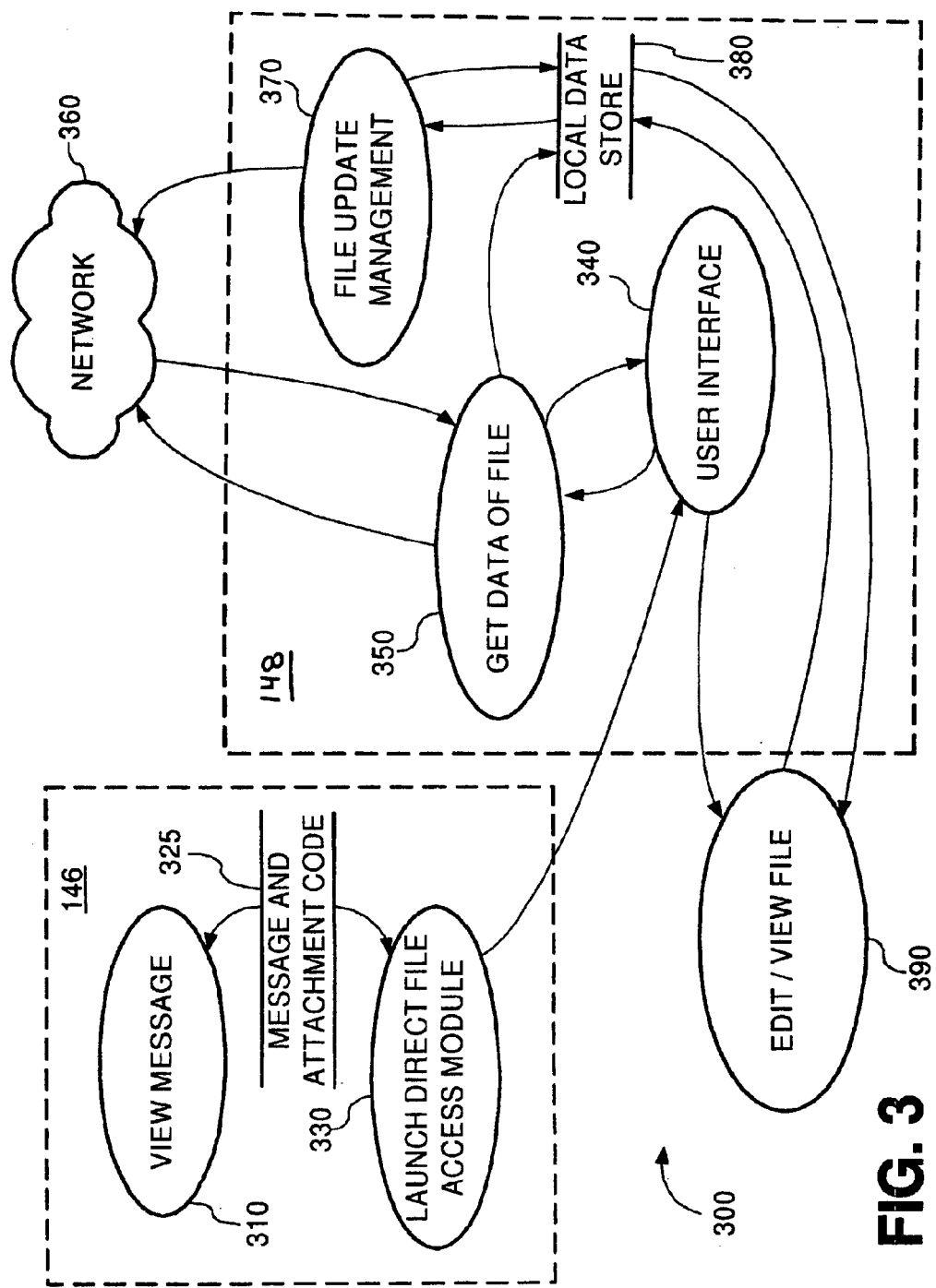
FIG. 3 is a data flow diagram of a method for accessing data transmitted by the method of FIG. 2.

An exemplary method 300 for file access in system 100 may be better understood with reference to FIG. 3. (Again, neither this nor any other provided example limits the invention.) Computer 140 of FIG. 1 performs method 300 during operation of direct file access module 148.

Method 300 begins (process 310 of FIG. 3) with file accessor 198 (FIG. 1) viewing message 325 (FIG. 3) using e-mail client module 146. Message 325 is a copy of data from message 222 (FIG. 2), received at computer 140 from computer 110 via network connection 14 (FIG. 1). Message 325 also includes a reference to file 222 of FIG. 2. In exemplary system 100 and methods 200 and 300, this reference is a code attachment, which file accessor 198 can execute to implement direct file access module 148.

Method 300 continues (process 330 of FIG. 3) with launching of direct file access module 148, which then carries out processes 340, 350, and 370. (FIG. 3 depicts these latter processes inside a dashed box labeled with the reference number of module 148.) Process 340 presents a user interface to the file accessor. This user interface can be as simple as a dialog box asking the user to confirm whether he or she wants to access a specified file. User interface process 340 can be omitted entirely if opening a single file automatically upon launch of module 148 is acceptable.

A more complex and full-featured interface, for accessing multiple files or folders in accordance with various aspects of the invention, has the look and feel of the familiar file management interfaces provided in conventional operating systems. For example, the user interface can provide a view of multiple subfolders within a folder in which a file manager has authorized access to various files. With such an interface, a file accessor can easily select particular files that he or she wishes to view or modify (depending on the authorization level granted) without needing to retrieve data of other files.

User interface process 340, as directed by file accessor 198, cooperates with process 350 to obtain data of file 222 (FIG. 2) from access server 170 (FIG. 1). This process may be better understood with reference to FIG. 1, as everything happening outside computer 140 is represented schematically in FIG. 3 by network cloud 360. During process 350, direct file access module 148 of computer 140 communicates with network file transfer interface 172 of access server 170, which retrieves file 222 from storage 174 and transmits data of file 222 to module 148 via network connection 47.

Process 350 stores data of file 222 in a local data store 380 (see FIG. 3), which computer 140 maintains within storage module 144. User interface process 340 can then transfer user interface focus to an editing or viewing process 390 (e.g., in a new user interface window). File accessor 198 can then view or modify file 222 using an appropriate software module. For example, accessor 198 can view or edit a text document with a word processor.

Access to file 222 in exemplary method 300 occurs indirectly, via a cached copy of the file within local data store 380. Advantageously, any modifications made to file 222 are first made to the cached copy and only later applied to the original file in storage 174 of access server 170. Process 370 determines when updates to the original file 222 are appropriate based on the state of the cached copy in local data store 380. Process 370 then communicates with server 170, as schematically represented by network cloud 360, and performs the updates accordingly.

The deferred file modification of exemplary method 300 advantageously accesses the file locally, i.e., within computer 140, reducing the amount of network traffic required for extensive file viewing and modification. In addition, deferred modification can simplify version control of modifications to the original file 222. As discussed below with reference to FIGS. 7-10, files can be updated with editors' modifications using a block or byte differencing scheme.

An advantageous variation of a direct file access module according to various aspects of the invention includes a drive mapping user interface. Such an interface permits access to a folder or folders in storage module 174 of server 170 (FIG. 1) much as if the folder contents were actually maintained within computer 140.

Exemplary methods 700 and 800 for coordinating modifications to a directly accessed file in accordance with various aspects of the invention may be better understood with reference to FIGS. 7-10. As above, modifications to example file 222 (FIG. 2) are discussed in the context of exemplary system 100 (FIG. 1) and methods 200 and 300 (FIGS. 2 and 3).

Figure 7:
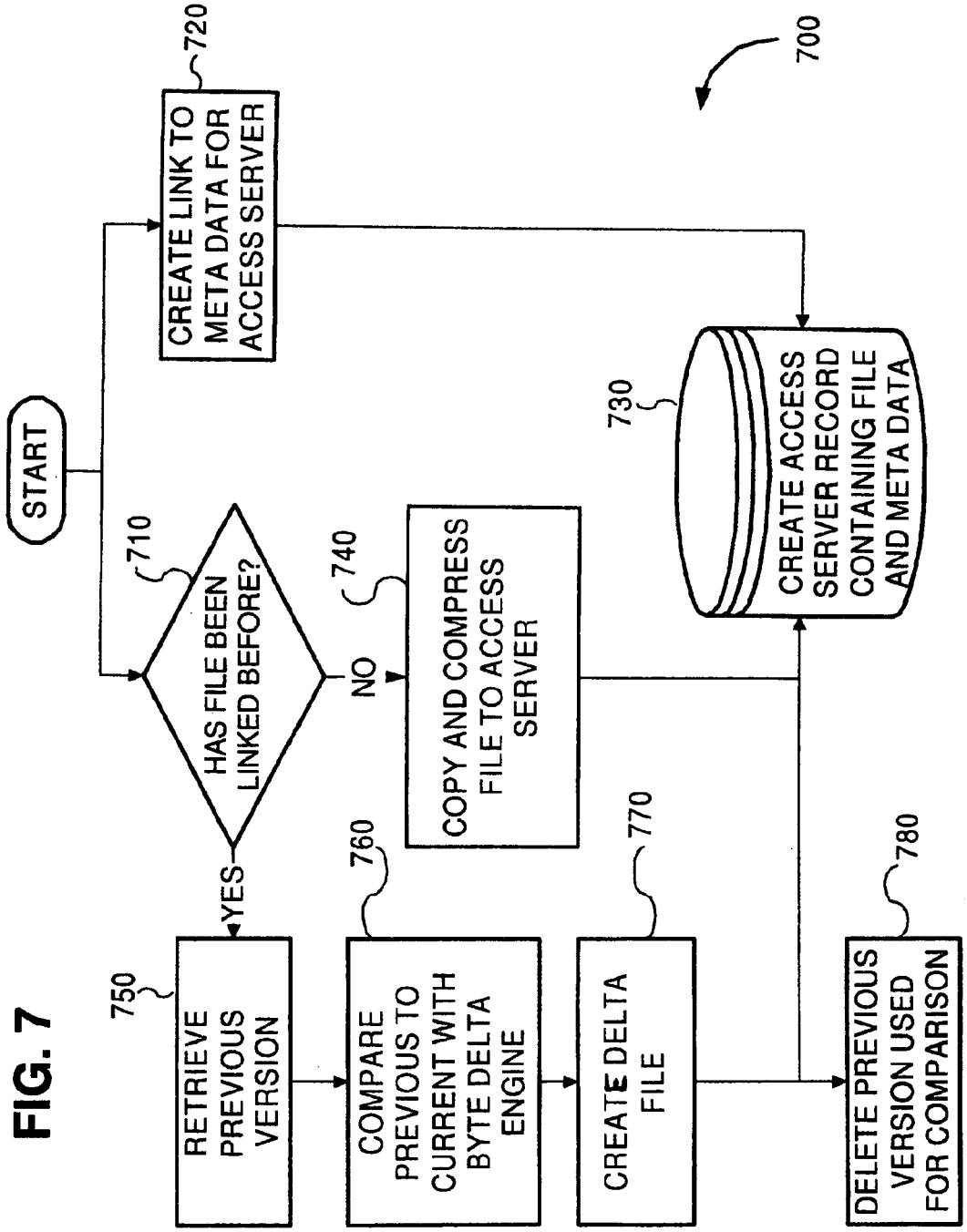
FIG. 7 is a functional flow diagram of processing performed to maintain file modifications using byte differencing according to various aspects of the invention.

FIG. 7 is a functional flow diagram of a method 700 for maintaining file 222 with byte differencing. Method 700 begins with two parallel steps. Decision step 710 determines whether file 222 has been directly accessed by (e.g., linked to) a file editor. Without depending on the result of decision step 710, step 720 creates a reference (e.g., a link) to data of file 222 at access server 170.

If a file editor has directly accessed file 222 before method 700 begins (or at least before the instance of method 700 depicted in FIG. 7), processing proceeds to step 750, which retrieves the previous version of file 222. Process 760 then compares the previous version to the current (i.e., accessor-modified) version with a byte delta engine. A byte delta engine compares individual bytes of two files, using any suitable hardware and software, and produces indicia of differences between the individual bytes. Processing then proceeds to process 770, which creates a delta file including such indicia. Process 770 sends the delta file to access server 170 along with the reference created at process 720, as depicted by storage process 730. (The delta file is preferably sent in a suitably encrypted and compressed form.) At concluding process 780 of method 700, the previous version of file 222 is optionally deleted.

If a file editor has not directly accessed file 222 before method 700 begins, process 740 simply compresses file 222 (preferably encrypting it as well) and transmits it (e.g., using method 200) from computer 110 of file manager 102 to access server 170. No person with authorization to modify file 222 has accessed it, and no differencing is necessary.

Figure 8:
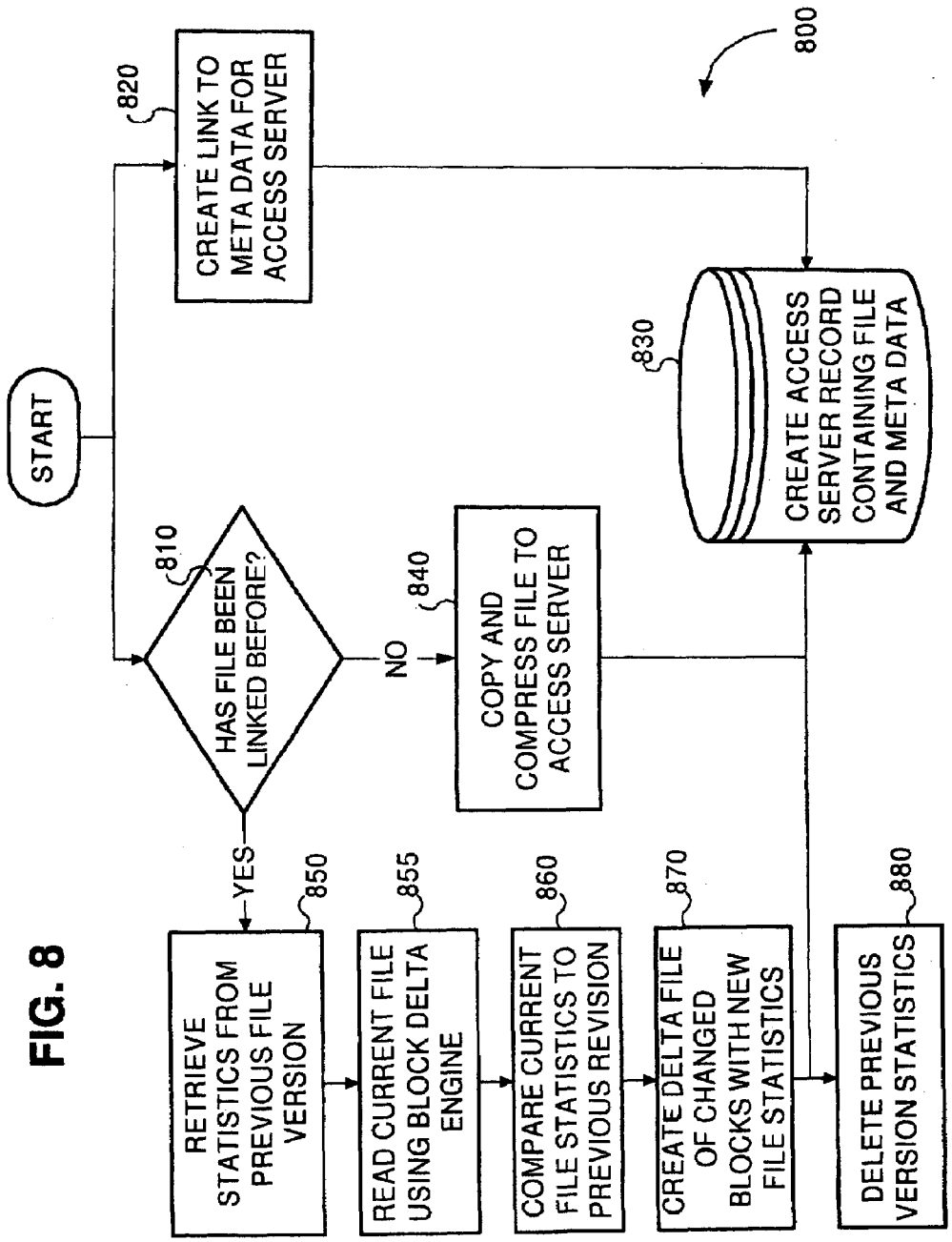
FIG. 8 is a functional flow diagram of processing performed to maintain file modifications using block differencing according to various aspects of the invention.

FIG. 8 is a functional flow diagram of a method 800 for maintaining file 222 with block (instead of byte) differencing. Processing proceeds much as it does in method 700, in that processes 810, 820, 830, and 840 of method 800 are analogous to processes 710, 720, 730, and 740 of method 700. However, process 850 retrieves block statistics of the previous version of file 222 rather than the file itself. The reason for this is that each block is a separate unit of file 222, and only blocks that change as a result of an editor's modification of file 222 need to be conveyed to access server 170. Any suitable type of statistic uniquely descriptive of data within a block, to a desired degree of statistical certainty, can be employed, for example an SHA-1 hash or 32-bit CRC.

Processing proceeds to step 855, which reads the modified (i.e., current) version of file 222. Step 860 then compares statistics of the two versions' blocks, and step 870 creates a delta file of changed blocks with statistics for the modified file's blocks. Step 880 concludes method 800 by optionally deleting statistics for the previous version of file 222.

Exemplary methods 300, 700, and 800 of FIGS. 3, 7, and 8 may be better understood in the context of a more specific example of direct file access, which refers to system 100, file manager 102, and file accessor 198 of FIG. 1. That example may be better understood with reference to TABLE I, TABLE II, and TABLE III below. In the example, system 100 is configured as follows: (1) file accessor 198 has direct file access authorization for editing an example file; (2) the directly accessed file is decrypted and decompressed when opened or saved; (3) e-mail client module 146 is suitably modified to implement custom functions according to various aspects of the invention; and (4) computer 140 implements an additional module (not shown) of the type discussed above that replaces file attachments with file references.

TABLE I begins the description of the example by listing preferred sequences of steps when file accessor 198 accesses a file.

TABLE I

| Event | Primary Actor (FIG. 1) | Action Performed |
|---|---|---|
| 1 | Accessor 198 | Selects attachment with "DFA" extension (attached to e-mail message) provided by e-mail client 146. ("DFA" stands for "Direct File Access," but suitable extension can be used.) |
| 2 | Computer 140 | Upon selection of attachment with "DFA" extension, launches direct file access module 148 (here, software installed on computer 140), which presents dialog box with two options: "Open File" and "Save File" |
| 3 | Accessor 198 | Selects either option - the "DFA" extension is used for the attachment and is registered as an extension so as to activate direct file access module 148, which either: |
| 4(a) | Computer 140 | If "Open File" is selected, downloads the file to a temp or attachments folder, as is conventionally done when an attachment is opened from an e-mail message. |
| 4(b) | Computer 140 | If "Save File" is selected, downloads the file to a location identified by accessor 198. |
| 5 | Computer 140 | While the file is being written to the temp or attachments folder (option a), or the accessor-identified folder (option b), it is also copied to a client database residing in storage 144. The file written there represents a file (revision) that was sent by manager 102. Once this file is stored in the client database, it is available for retrieval by accessor 198, if accessor 198 later selects the "DFA" extension file attached to that message. The need to retrieve the file from access server 198 a second time is thus avoided. Copying the file to this client-side database also maintains the revision relationship between the e-mail message from manager 102 and the "DFA" file reference attachment. |
| 6 | Computer 140 | Records the location of the downloaded file as being in the temp or attachments folder for future reference. |

TABLE II continues the description of the example by listing preferred sequences of steps when file accessor 198 transmits file modifications back to file manager 102.

TABLE II

| Event | Primary Actor (FIG. 1) | Action Performed |
|---|---|---|
| 1 | Accessor 198 | Modifies the file. (Accessor 198 is identified as an editor in this example.) |
| 2 | Accessor 198 | Attaches file to e-mail message and sends message back to manager 102 and any other desired recipients. |
| 3 | Computer 140 | Removes the attached file before the message reaches network connection 14. |
| 4 | Computer 140 | Recognizes the file based on data held in the client-side database in storage 144 and retrieves a copy of the earlier version of the file from the database. |
| 5 | Computer 140 | Compares the earlier and modified versions using a suitable selected differencing engine (byte or block) and creates a delta, i.e., a forward delta. |
| 6 | Computer 140 | Writes delta into the client-side database and tags it there as a sequential delta to the original baseline file downloaded by accessor 198. |

TABLE II-continued

| Event | Primary Actor (FIG. 1) | Action Performed |
|---|---|---|
| 7 | Computer 140 | Creates (or updates) delta file containing meta data about the difference, including: Original (baseline) file ID (ties to original message); Current Message Info; Message Originator; Message Recipient(s); Message Subject; Message Date; Current File Info; Modification Date; Modified Size; and Delta Size. |
| 8 | Computer 140 | Sends delta file to access server 170 via network connection 47. |
| 9 | Access Server 170 | Reads the meta data and stores the delta in a database in storage 174 such that it is retrievable from server 174 by file manager 102 and any other specified recipients as: (1) a complete file, for recipients other than file manager 102 who have not retrieved the file previously; or (2) a delta file. |

TABLE III concludes the description of the example by listing preferred sequences of steps when file manager 102 accesses the modified file.

TABLE III

| Event | Primary Actor (FIG. 1) | Action Performed |
|---|---|---|
| 1 | Manager 102 | Selects attachment with "DFA" extension (attached to e-mail message) that was provided by client 116. |
| 2 | Computer 110 | Upon selection of attachment with "DFA" extension, launches module (not shown in FIG. 1), which presents dialog box with two options: "Open File" and "Save File" |
| 3 | Manager 102 | Selects either option - the "DFA" extension on the attachment activates direct file access module 148: |
| 4 | Computer 110 | Based on the delta file and the baseline version of originator 102, reconstructs a version of the file as modified by file accessor 198. |
| 5(a) | Computer 110 | If "Open File" is selected, downloads the reconstructed file to a temp or attachments folder, as is conventionally done when an attachment is opened from an e-mail message. |
| 5(b) | Computer 110 | If "Save File" is selected, downloads the reconstructed file to a location identified by manager 102. |
| 6 | Computer 110 | While the reconstructed file is being written to the temp or attachments folder (option a), or the file manager-identified folder (option b), the delta file is copied to a client database residing in storage 114. The delta file written there represents a file (revision) that was sent by file accessor 198. Copying the delta file to this client-side database maintains the revision relationship between the e-mail message from accessor 198 and the delta file attachment. |
| 7 | Computer 110 | Records the location of the downloaded file as being in the temp or attachments folder for future reference. |

Exemplary systems and methods for manual determination of authorization data may be better understood with reference to FIGS. 4 and 5, which depict respective electronic message windows 400 and 500. An electronic message window according to various aspects of the invention includes any aggregation of visible elements on a computer display that a user would recognize as suitable for the composition of electronic messages. Windows 400 and 500 include, respectively: message recipient fields 412 and 512 labeled "TO:"; secondary message recipient fields 414 and 514 labeled "CC:"; secret secondary message recipient fields 416 and 516 labeled "BCC:"; file identification fields 430 and 530; message subject fields 440 and 540; and message text fields 450 and 550. In variations where the benefits of these fields are not required, some may be omitted.

In accordance with various aspects of the invention, message windows 400 and 500 further include respective file viewer fields and file editor fields. Indicia of a file accessor's address recorded in a file viewer field authorizes that person to view but not modify a file specified in the message window's file identification field. Indicia of the file accessor's address recorded in a file editor field authorizes that person to modify the specified file. A file manager can designate multiple file viewers and file editors in any desired combination by entering multiple addresses in appropriate fields.

In exemplary system 100 and method 200 and 300, file accessor 198 can receive message 224 as a "TO:", "CC:", or "BCC:" message recipient in addition to receiving file access authorization. Other recipients of message 224 need not be informed that accessor 198 has received access authorization in addition to message 224, though message 224 can include publicly readable indicia to that effect if desired.

Window 400 of FIG. 4 includes a file viewer field 424 labeled "Viewer:" and a file editor field labeled "Editor:". (The label text can be in uppercase or lowercase characters, in any words, e.g., in a foreign language, that are linguistic equivalents.) File manager 102 can designate file accessor 198 as a viewer or editor by entering his or her electronic mail address in viewer field 424 or editor field 426. File manager 102 can also designate accessor 198 as a "TO:", "CC:", or "BCC:" message recipient by entering the address in fields 412, 414, or 416, respectively.

File manager 102 can replicate a file accessor address in a second field of message window 400 by simply retyping the address or cutting and pasting. Advantageous variations of e-mail client module 116 automatically replicate the address to a second field, which is referenced to the field in which the address was originally entered. Thus file manager 102 is relieved of having to type the address twice.

In one such variation, selection of an entered address (e.g., by "right-clicking" on the address with a pointing device) causes a context menu to appear that allows quick designation of an additional field for that address. For example, FIG. 4 depicts a context menu 464 appearing on top of window 400 as a result of right-clicking on address 462 to "charles@company.com". Context menu 464 includes three menu items for replicating the address "charles@company.com" in fields 412, 414, or 416. Similar selection of address 464 to "alice@company.com" causes a context menu (not shown) to appear with menu items "Viewer" and "Editor" for replicating the address in fields 424 or 426. In the example of FIG. 4, file manager 102 has entered "alice@company.com" into "BCC:" field 416 and replicated it to "Viewer:" field 424.

The text of addresses replicated elsewhere can function as hyperlinks. When selected with a pointing device, such text can transfer cursor focus to the referenced address or bring up a context menu (e.g., menu 464) when selected with a pointing device.

Advantageously, manually entered and replicated addresses can appear differently in a message window according to various aspects of the invention. In message window 400, for example, addresses not replicated (e.g., address 466 to "consultant@university.edu") have a first appearance. In window 400, the first appearance is just ordinary text. Addresses originally entered in a field and replicated in another (e.g., address 462) have a second appearance, which in window 400 is underlined text. Addresses replicated from another field (e.g., address 468 in field 412) have a third appearance, which in window 400 is italicized text. The different appearances can also utilize different colors, in which case text having the second appearance can have the blue color commonly found in hyperlinks.

In other advantageous variations of e-mail client module 116, file viewer and file editor fields can have different forms than the conventional "TO:", "CC:", or "BCC:" message recipient fields. For example, window 500 of FIG. 5 includes, in addition to conventional message recipient fields 512-516, a file viewer field 524 and a file editor field 526. In region 520 of exemplary message window 500, fields 524 and 526 each consist of a column of vertically arranged radio buttons. Each row corresponds to an address entered into one of the conventional message recipient fields 512-516.

Conventionally, radio button user interface elements are clustered in groups in which one and only one button is selected. To conform with this convention, region 520 also includes a "no authorization" field 522 of radio buttons. When, for a given address, neither the corresponding "viewer" radio button of field 524 nor the "editor" radio button of field 526 is selected, the corresponding "no autho-rization" radio button of field 522 becomes selected. Thus, one radio button in each row, for each address, remains selected.

In window 500, the number of rows in each of fields 522, 524, and 526 matches the number of addresses recorded in fields 512-516. Recording of more or fewer addresses will result in more or fewer rows of buttons in region 520. Preferably, the state of a deleted row is retained after it is deleted (such as by using grayed text) so that it can be restored if the corresponding address is again recorded in one of fields 512-516. In system 100 and method 200, for example, file manager 102 may decide to remove "alice@company.com" from "CC:" field 514 and place that address instead in "BCC:" field 516. If file manager 102 identified the address as belonging to a viewer of the file "Widget Design Spec.rtf" when the address was recorded in field 514, he or she is likely to appreciate the convenience of having the same identification appear when the address is recorded in field 516.

In variations where both automatic and manual authorization determination are employed in combination, automatic determinations can produce default identifications of viewers and editors to enhance user convenience. If "bob@company.com" is determined to be an address belonging to an editor having editing privileges of the file "Widget Design Spec.rtf," for example, that address can be automatically replicated to "Viewer:" field 424 of window 400 when entered in field 412, 414, or 416. Similarly, the address can appear in a region 520 of window 500 with its corresponding radio button of field 526 automatically selected when entered in field 512, 514, or 516.

In further variations, automatic determinations of authorization can have a higher priority, overriding any manual identifications of addresses as viewers or editors. An override of manual identification can be visually indicated. For example, some radio buttons in region 520 of window 500 may be "grayed out." Menu items that would otherwise identify an address as a viewer or editor in window 400 may be similarly grayed out.

The examples of FIGS. 4 and 5 illustrate the convenience and simplicity of file access via electronic mail in accordance with various aspects of the invention. In both examples, a manager of the file "Widget Design Spec.rtf" grants three different types of access authorization to four different people with just a simple e-mail message. Two of the people ("Bob" and "Charles"), who are colleagues of the file manager within "Company," are identified as editors having direct access authorization. They are thus able to modify the file, and the file manager instructs Bob and Charles to do so in the body of the message (fields 450 and 550).

Another person ("Alice") within "Company" is also granted direct access authorization to the file, but only to view it. Alice may be a person in a different department that is only involved in a review capacity, or a person having lower seniority within the organization who is authorized only to comment on the file's contents.

A fourth person ("Consultant") at an outside institution "University" is not granted direct file access authorization. This may be due to a number of reasons. For example, the outside institution may not have a compatible network connection to an access server from which the file is directly accessed. As another example, the computer systems administrator for "Company" may have a policy prohibiting direct file access by persons outside the organization's local area network. "Consultant" receives her copy of the file as a conventional attachment to her copy of the message. (The other recipients of the message do not need to receive copies of the file as attachments because they can access the file directly.)

Windows 400 and 500 present the file manager with a familiar, intuitive interface for managing access to the file "Widget Design Spec.rtf." To authorize direct file access, the file manager needs perform only one of three simple tasks. The first option is to enter an e-mail address into a "Viewer:" or "Editor:" field (424 or 426). The second option is to right-click an e-mail address already entered into a conventional "TO:", "CC:", or "BCC:" field (412-416). The third option is to select a radio button. By providing these novel extensions to the familiar user interface found in conventional e-mail systems, the various aspects of the present invention provide the convenience of sending files as attachments while maintaining the benefits of network access to shared files.

As discussed above with respect to FIGS. 7-8 and TABLE II, a file can be transmitted differently depending on whether the recipient possesses the previous version of the file or not. If the recipient has retrieved an immediately previously version of the file, transmitting just a delta file (e.g., including only blocks or bytes changed from the previous version) is sufficient. The recipient's computer can store the delta with the previous version so that when the recipient opens the document the delta is available to patch the original and compile the version requested (not necessarily the latest version). If the recipient has not retrieved the previous version, the entire file is transmitted and stored on the recipient's computer.

In addition, when a user updates a file, the user's computer can transmit just a delta file if the entity to whom it is transmitting the update is known to possess an immediately previous version of the file. The user's computer can store the delta data locally along with the previous version where it can attach the previous version on demand to reconstruct the updated version, e.g., for transmission to another entity, repeated viewing, or further updating. Otherwise, the user's computer can transmit the file, as updated, in its entirety.

A collaborative file update system according to various aspects of the invention efficiently transmits data representative of an updated version of a file to users who are designated as recipients of the file. Users designated as recipients of both the updated and an immediately previous version of the file receive a delta file. The delta file consists substantially of data representing the difference between the updated version of the file and its previous version. Thus, users who are capable of obtaining an updated file version merely by patching an immediately previous version with a delta file receive only that delta file. The entire file as updated need not be transmitted in such cases.

According to a particular aspect of the invention, users designated as recipients of the updated version but not the immediately previous version receive data of the updated file itself rather than a delta from any previous version. The file is updated before transmission, and the complexity of transmitting multiple deltas for updating after transmission is avoided.

A collaborative file update system according to various aspects of the invention can include all the hardware and software (discussed above) of an electronic mail file access system of the invention. For example, such a system can advantageously transmit e-mail messages containing references to files rather than the files themselves, as discussed above with reference to FIGS. 1-3. The referenced files reside on an access server that is commonly accessible to both sender and recipient of the file. In variations of a collaborative file update system where the benefits of referenced file transmission are not required, the system can transmit files bodily as attachments instead.

Figure 9:
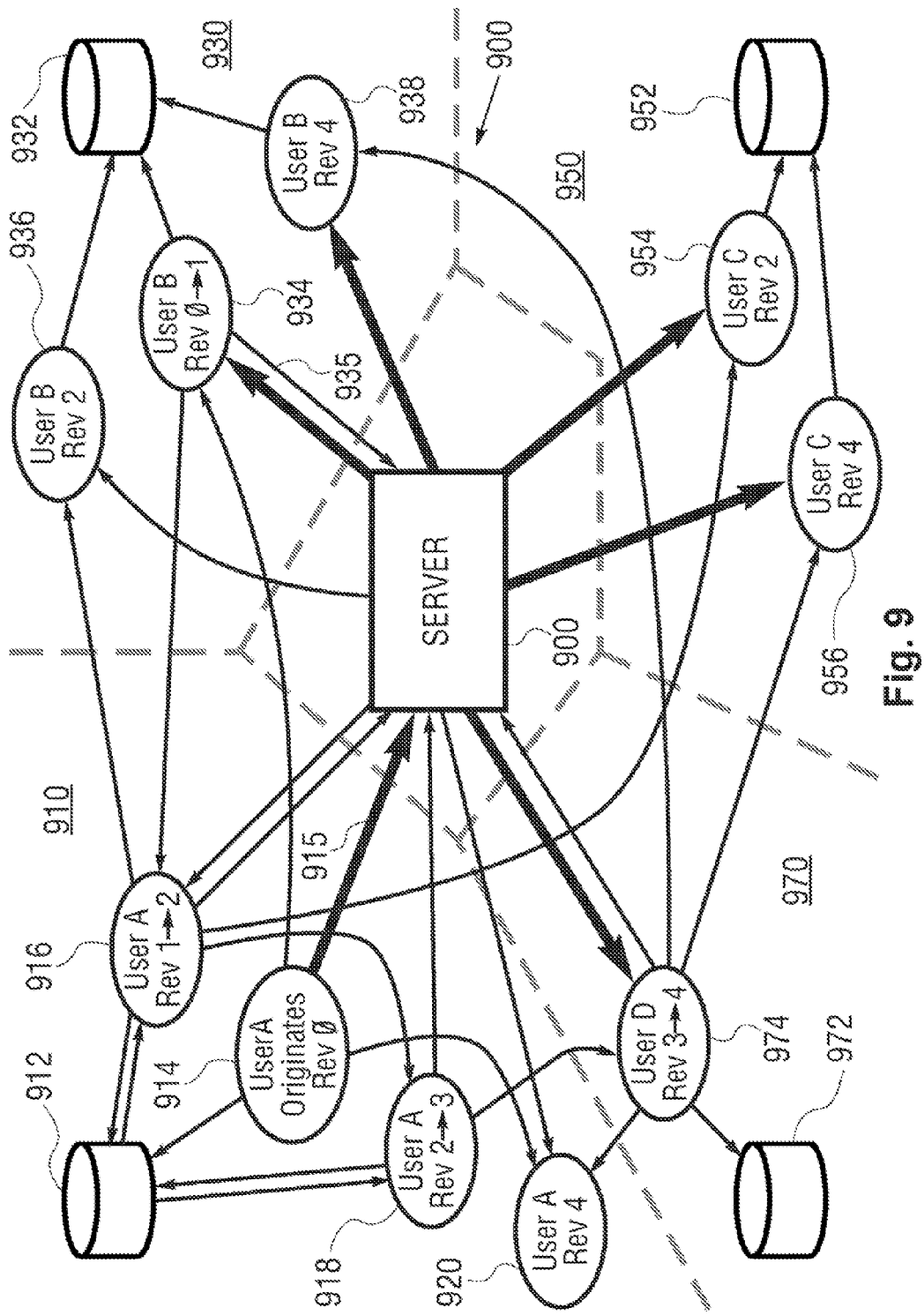
FIG. 9 is a data flow diagram illustrating operation of a collaborative file update system according to various aspects of the invention.

FIGS. 10-19 illustrate different states of a collaborative file update system, employed as part of an electronic mail file access system according to various aspects of the invention, during an exemplary method 900 illustrated in FIG. 9.

A collaborative file update method of the invention, of which method 900 is an example, manages transmission of a file's revisions among a plurality (in the example, four) of users "A" through "D," none of whom are shown in the drawings. Exemplary method 900 includes various processes, which in FIG. 9 are grouped together according to the user's workstation (i.e., computer) on which they run. Processes 914-920 of group 910 run on a computer 1020 (see FIG. 10) of a first user A having a local data store 912. Processes 934-938 run on a computer 1030 of a second user B having a local data store 932. Processes 954-956 run on a computer 1440 (see FIG. 14) of a third user C having a local data store 952. Process 974 runs on a computer 1630 (see FIG. 16) of a fourth user D having a local data store 972.

Each one of the illustrated processes of method 900 accepts a reference to data of a file transmitted by one of the users, retrieves the referenced data from a commonly accessible server 990, and writes the data to its local data store. Processes 916, 918, 934, and 974 also modify the file to a succeeding version, transmitting data of the file to server 990 and a reference to the file data to at least one of the users.

FIGS. 10-19 illustrate hardware and data structures employed during processes 914-974 of method 900 within dashed enclosures. Like numbers reference enclosures of FIGS. 10-19 and associated processes of FIG. 9.

Exemplary method 900 as illustrated in FIG. 9 begins with process 914, at which user A originates "rev 0" of a file. A method of the invention for managing transmission of file revisions can be a portion of a larger overall method, and thus "rev 0" of method 900 can actually represent some revision of a file originated earlier in a method (not shown) that encompasses method 900. Similarly, method 900 does not modify the file beyond "rev 4" (at process 974, see FIG. 18), but such an encompassing method can include processes (again, not shown) that can further modify the file.

Figure 10:
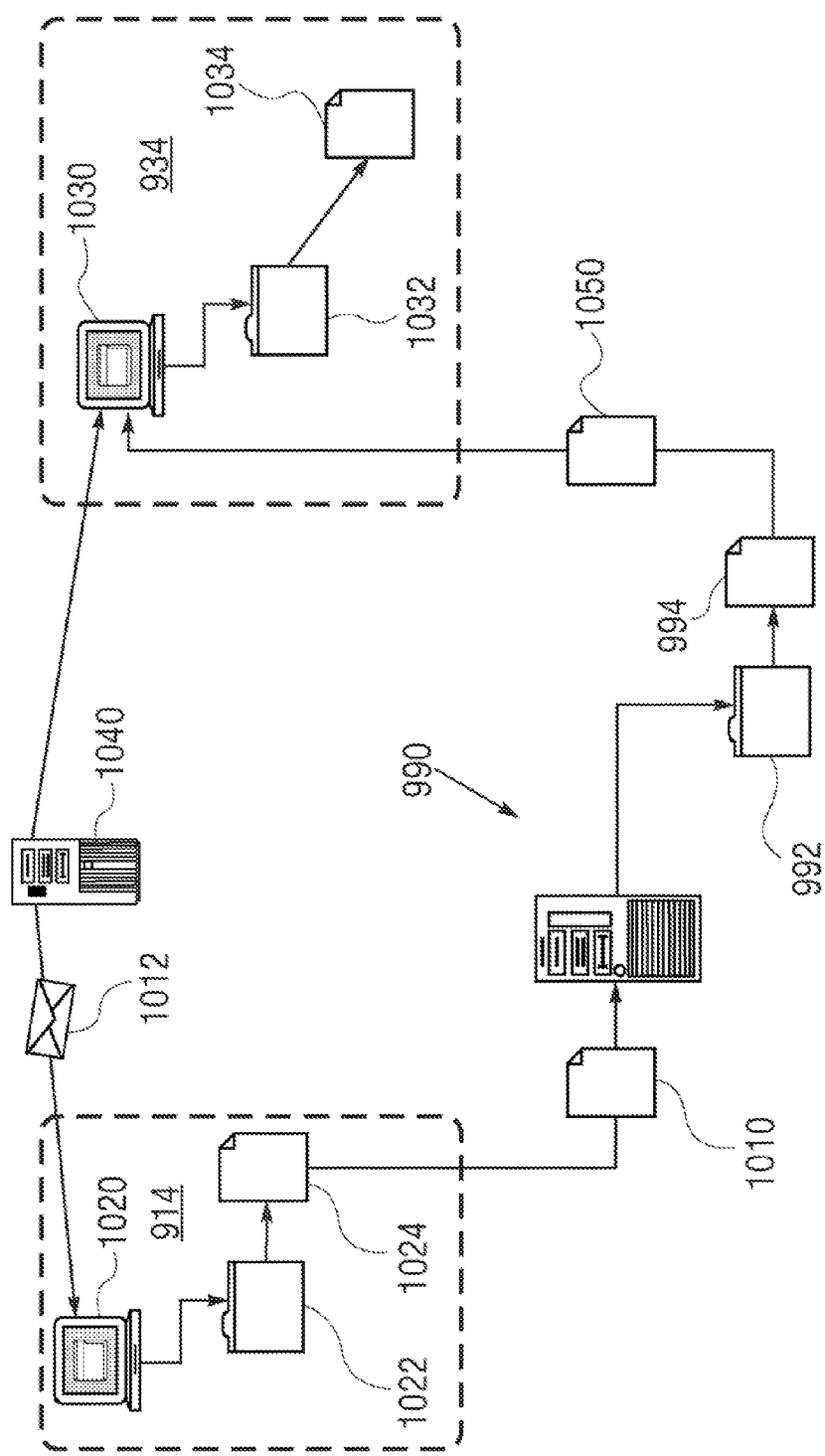
FIGS. 10-19 are schematic block diagrams illustrating a collaborative file update system according to various aspects of the invention at various states depicted in FIG. 9.

Through process 914 (FIG. 10), user A originates a file (or edits a file originated by earlier processes not shown), storing the file's data in a file data set 1024 on user A's computer 1020 (FIG. 10). Data set 1024 resides within an addressable data segment 1022 of local storage on computer 1020. FIG. 9 schematically depicts local storage of computer 1020 as data store 912.

An addressable data segment of local storage on a computer according to various aspects of the invention includes any collection of data that can be suitably selected with a particular name or identification code. As discussed in greater detail below with reference to FIG. 20, for example, segment 1022 (FIG. 10) of local storage for computer 1020 is a hierarchical directory (i.e., folder) structure on a hard disk controlled by computer 1020. File data set 1024, which is a file residing in the last sub-directory of segment 1022, stores a file's initial version (as generated or received locally) and delta data for reconstructing the file to a current revision. Data set 1024 is a standard filesystem file, i.e., a collection of characters addressable by filesystem path and file names. Other suitable types of addressable data segments and file datasets include, for example, a mySQL database table and its records and a "flat file" database with its offset-indexed records.

Process 914 transmits data 1010 representative of the file in its entirety (as FIG. 9 illustrates with a thickened arrow 915) to server 990, which writes data of the file to a file data set 994 that it begins maintaining for user A in an addressable data segment 992. Data 1010 can be suitably compressed, encrypted, or both.

Process 914 transmits an e-mail message 1012 to computer 1030 of user B via an e-mail server 1040. Message 1012 includes a file reference (not shown) of the type discussed above with respect to system 100 of FIG. 1, e.g., a hyperlink or direct file access module. The file reference enables user B, through process 934, to retrieve a copy 1050 of the file's data from server 990. Process 1030 writes the file's data to a file data set 1034 within a directory 1032.

Figure 11:
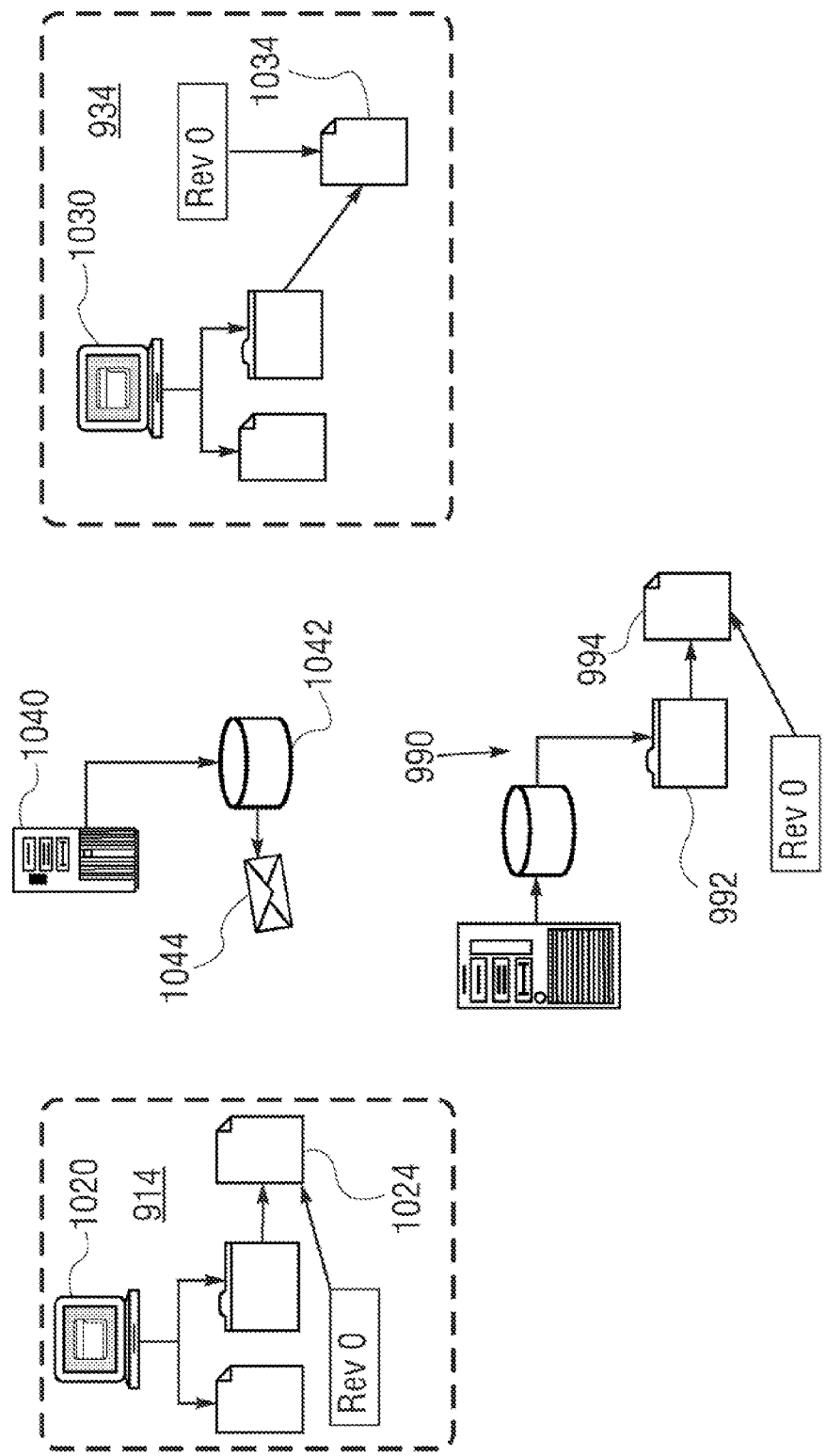

As illustrated in FIG. 11, process 914 concludes with a copy of the file, at "rev 0," in: (1) file data set 1024 of user A's computer 1020; (2) file data set 994 of server 990; and (3) file data set 1034 of user B's computer 1030. Also present at the conclusion of process 914 is a copy 1044 of e-mail message 1012 (FIG. 10) in local storage 1042 of e-mail server 1040. In a variation, e-mail server 1040 deletes any copy of message 1012 after process 934 retrieves it.

Figure 12:
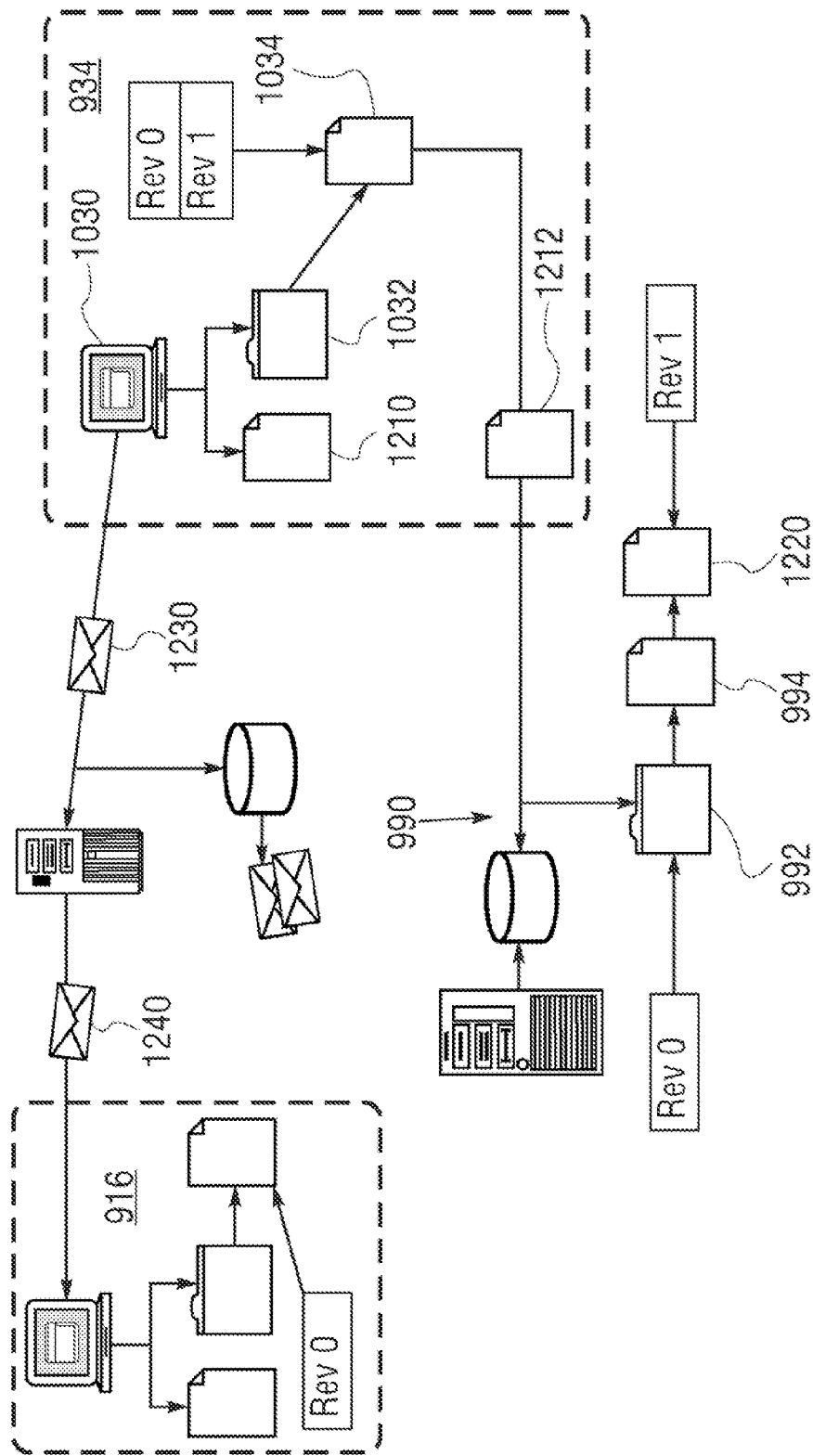

As may be better understood with reference to FIGS. 9 and 12, user B edits the file to "rev 1" through process 934, which continues method 900 by writing the resulting modified file 1210 locally, writing a delta "rev 1" that represents the file modification to file data set 1034 and transmitting data 1212 representing the delta to server 990. FIG. 9 illustrates the transmission of delta, rather than full, data with thin arrow 935.

A user's computer in a collaborative file update system according to various aspects of the invention advantageously avoids writing the entire data of an updated file back to a commonly accessible server when the computer has itself updated the file from a previous version that was received from the server. During process 934 of FIG. 12, for example, computer 1030 determines that the file's "rev 0" is present in its local file data set 1034. Thus, process 934 need only transmit the delta data 1212 back to server 990 instead of wastefully sending the entire contents of modified file 1210.

Figure 20:
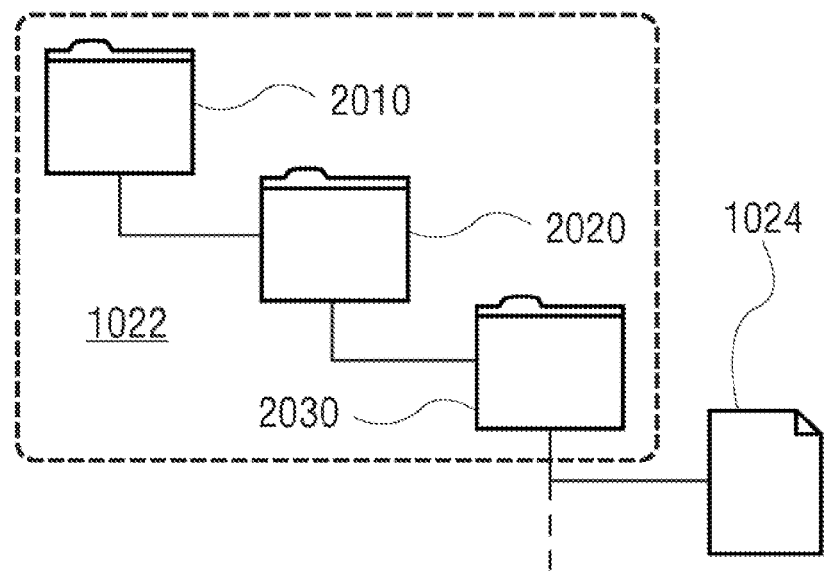
FIGS. 20-21 are schematic block diagrams of hierarchical directory structures used as addressable data segments of local storage according to various aspects of the invention.
Figure 21:
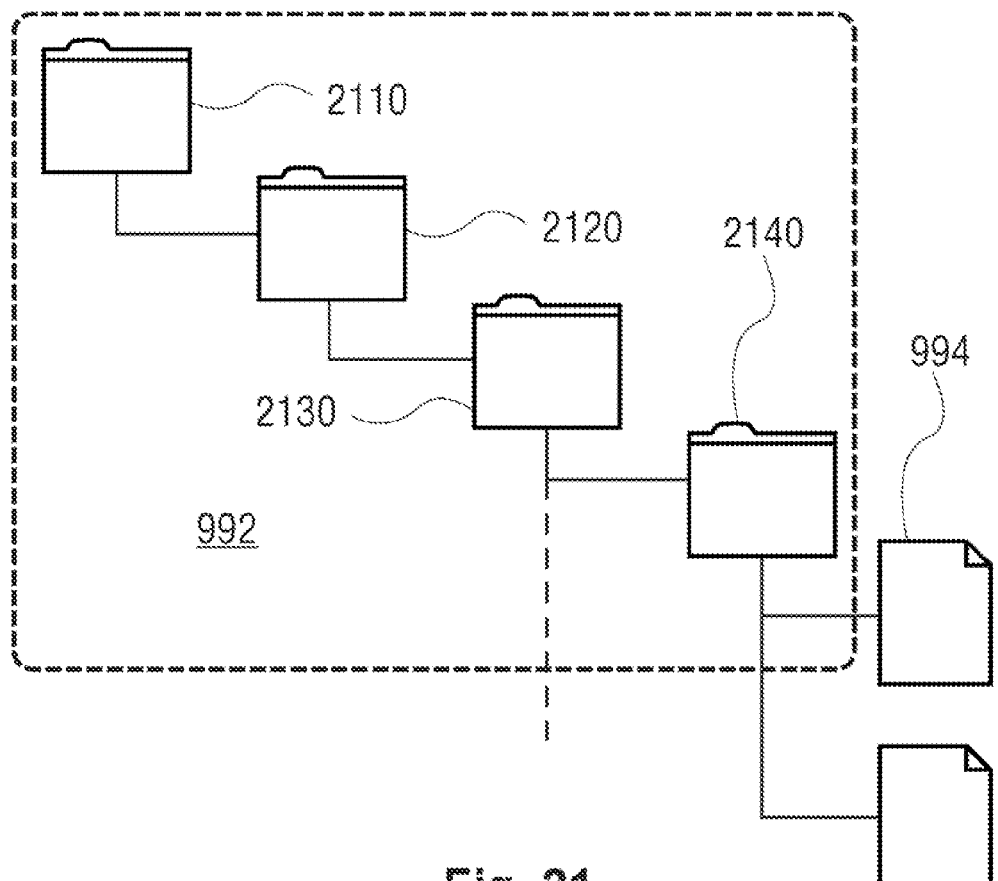

A preferred data structure for housing file data sets may be better understood with reference to FIG. 20-21. As mentioned above, FIG. 20 illustrates a hierarchical directory structure of addressable data segment 1022, which resides on a hard disk 912 (FIG. 9) controlled by user A's computer 1020 (FIG. 10). Segment 1022 includes a top level directory 2010, which resides in a desired directory or the root of the hard disk's file structure, and successive subdirectories 2020, 2030.

To facilitate fast and orderly selection of file data sets, a collaborative file update system according to various aspects of the invention can store the data sets as automatically named files within an automatically named succession of directories. For example, directories 2010-2030 of file data segment 1022 have names that are different substrings of a plausibly unique identification code (not shown). Exemplary file data segment 1022 employs a 128-bit identification code (32 hexadecimal characters), which can be a "Globally Unique ID" ("GUID") resulting from a standard call to the Microsoft Windows API. Top level directory 2010 uses the first two hexadecimal characters of this GUID code as its name, while directories 2020 and 2030 use the second and third pairs of characters, respectively, as their names. File data set 1024 uses the remaining 26 characters of the code as its name. Other types of plausibly unique codes can be employed, e.g., an SHA-1 hash of a concatenated file name, origination timestamp, and originating user name.

To facilitate tree balancing, e.g., in hierarchical directory structures 1022, 992 of FIG. 20-21, the plausibly unique identification code employed preferably has digits that are of a statistically uniform distribution. A GUID resulting from a call to the Microsoft WINDOWS 2000 or XP API may be considered sufficiently conforming to such a distribution while a GUID resulting from a call to the WINDOWS 95 API may be subjected to further processing to ensure a desired level of statistical uniformity.

Figure 13:
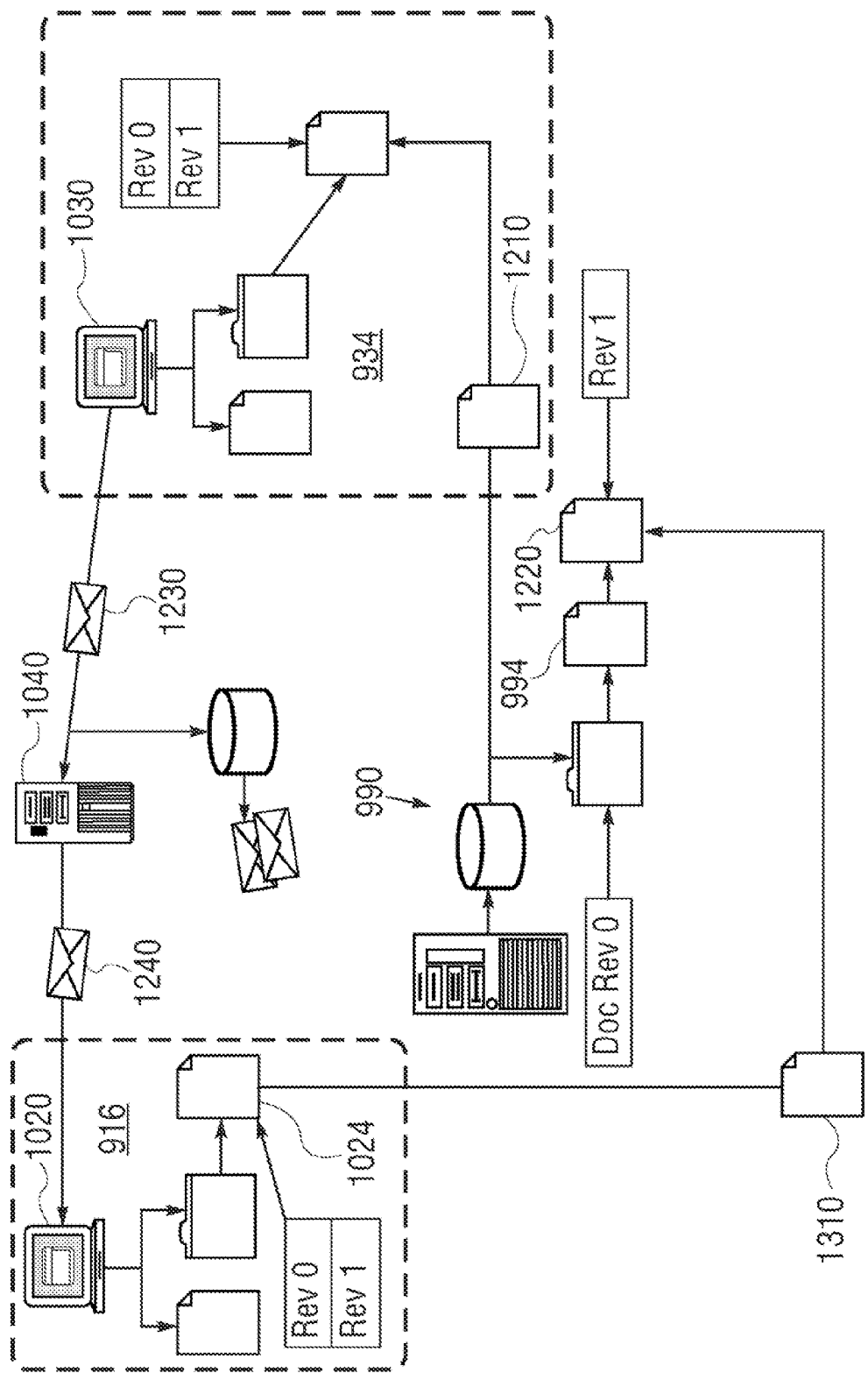
Figure 14:
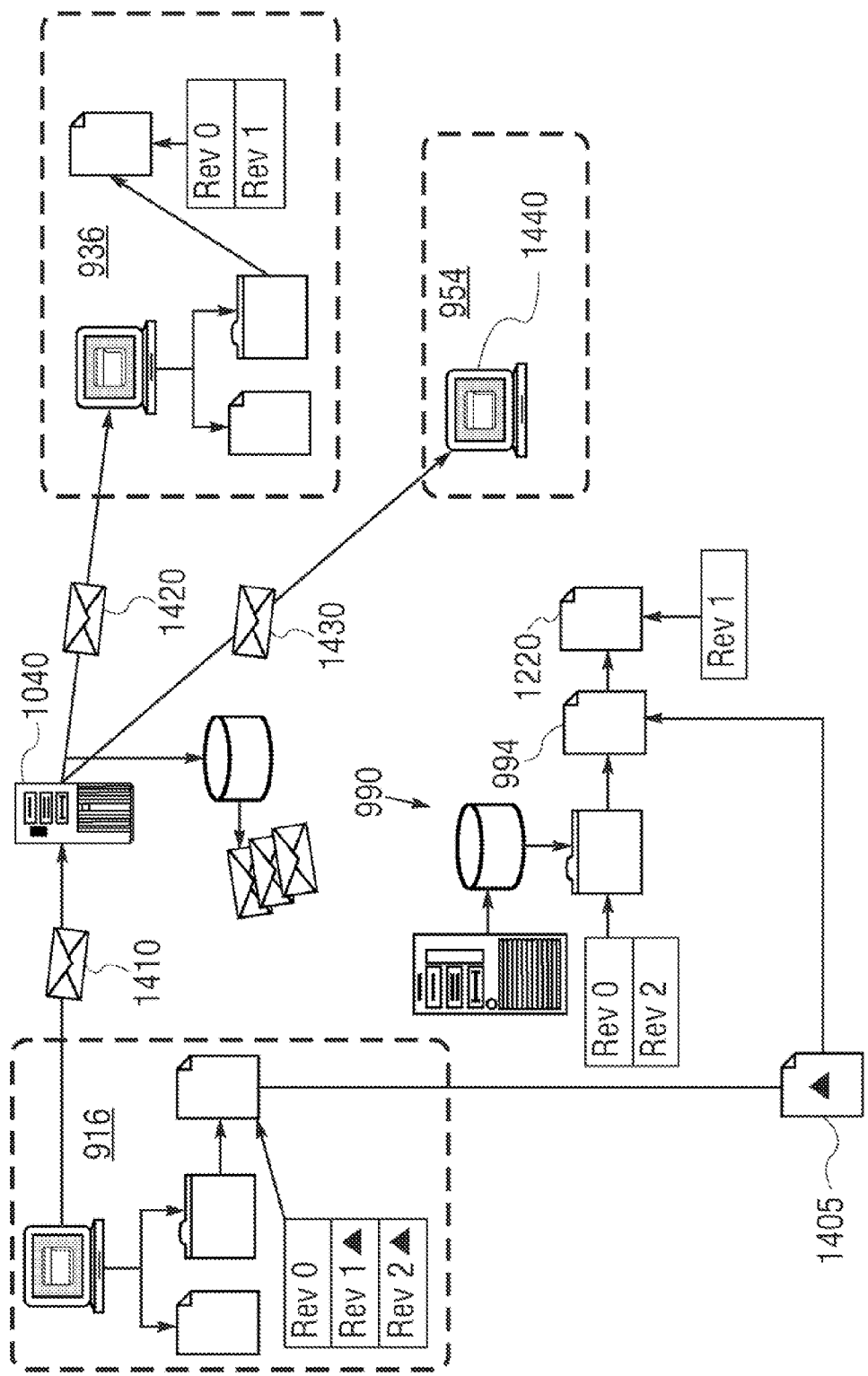

As illustrated in FIGS. 12-13, server 990 maintains a separate file data set 1220 in an addressable data segment 992 to house data (at this point, just the "rev 1" delta data) from user B's computer 1030. By maintaining a separate file data set for each user, server 990 avoids having to resolve write collisions caused by separate users storing several revisions to the file at the same time. Instead, whatever mechanism maintains the separate data sets (e.g., a kernel-level file system where data sets 994, 1220 are standard computer files) takes care of resolving simultaneous document edits.

FIG. 21 depicts addressable data segment 992 in detail, illustrating a hierarchy of four directories 2110-2140 and two file data sets 994, 1220 residing in the lowest-level directory 2140. Directories 2110-2130 use as their names the first, second, and third pairs of alphanumeric characters, respectively, of a 32-character code as described above. Directory 2140 uses the remaining 26 characters of the code as its name. File datasets 994, 1220 use plausibly unique identifiers associated with user A and user B, respectively, as their names. (All files containing file data sets can have a standard file extension in addition to a base file name.)

As may be better understood with reference to FIG. 9 as well as FIGS. 12-13, method 900 continues with process 916 receiving e-mail message 1240, relayed from message 1230 by server 1040. User A accesses "rev 1" data from server 990 via a file reference (none shown, but see e. g. FIG. 6B) in e-mail message 1240. Because file data set 1024 of user A's computer 1020 already includes "rev 0" data of the file, server 990 transmits just delta data 1310, which is a copy of delta data 1210 that user B's computer 1030 transmitted to server 990 in process 934. Data 1310 can include additional data elements, such as the date and time on which computer 1030 transmitted the original data 1210, information about other copies of data 1210 accessed by other users, etc. Data 1210 and 1310 can be in the same format or different formats can be suitably employed, e.g., data 1210 being more compressed in view of clients' typically slower upload data rates.

After receiving "rev 1" of the file, user A edits the file to "rev 2" through process 916 (FIGS. 9, 14), transmitting the delta data 1405 back to server 990 and an e-mail message 1410 including a reference to the new file revision to user B (e-mail copy 1420 to process 936) and to user C (e-mail copy 1430 to process 954) via e-mail server 1040. Server 990 keeps the "rev 2" delta data in data set 994, which it maintains for user A.

Figure 15:
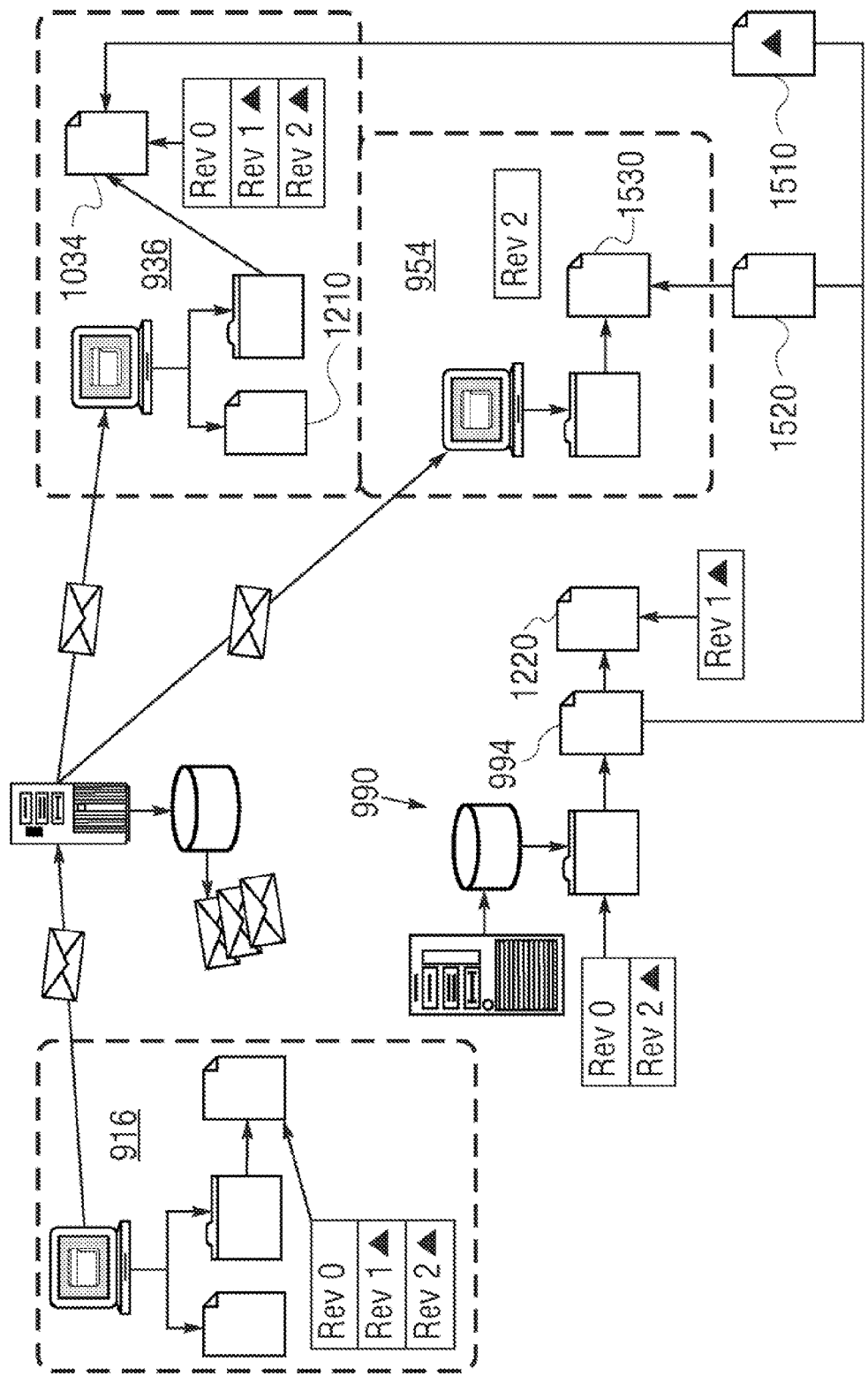
Figure 16:
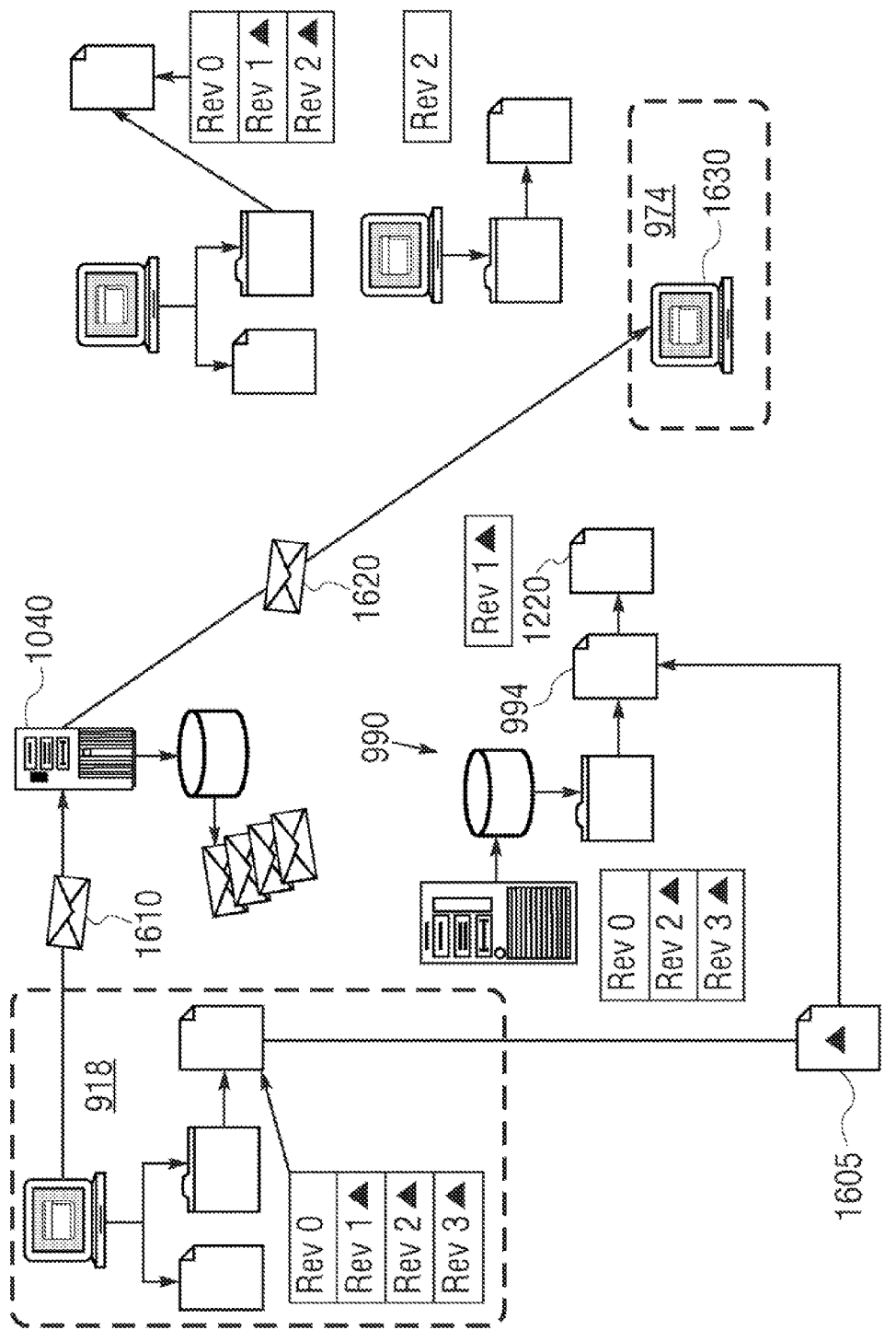

As may be better understood with reference to FIG. 15, process 936 retrieves delta data 1510 for "rev 2" of the file from server 990, which retrieves the data from data set 994. Process 936 only needs delta data 1510 rather than a complete copy of the file's new revision because it has a "rev 1" local copy of the file 1210 in its local file data set 1034. Updating copy 1210 (e.g., by replacing specified bytes or blocks) based on delta file 1510 is straightforward. Process 954, however, has no previous copy (or any copy, for that matter) of the file and thus obtains the entire contents of the "rev 2" file 1520.

Figure 17:
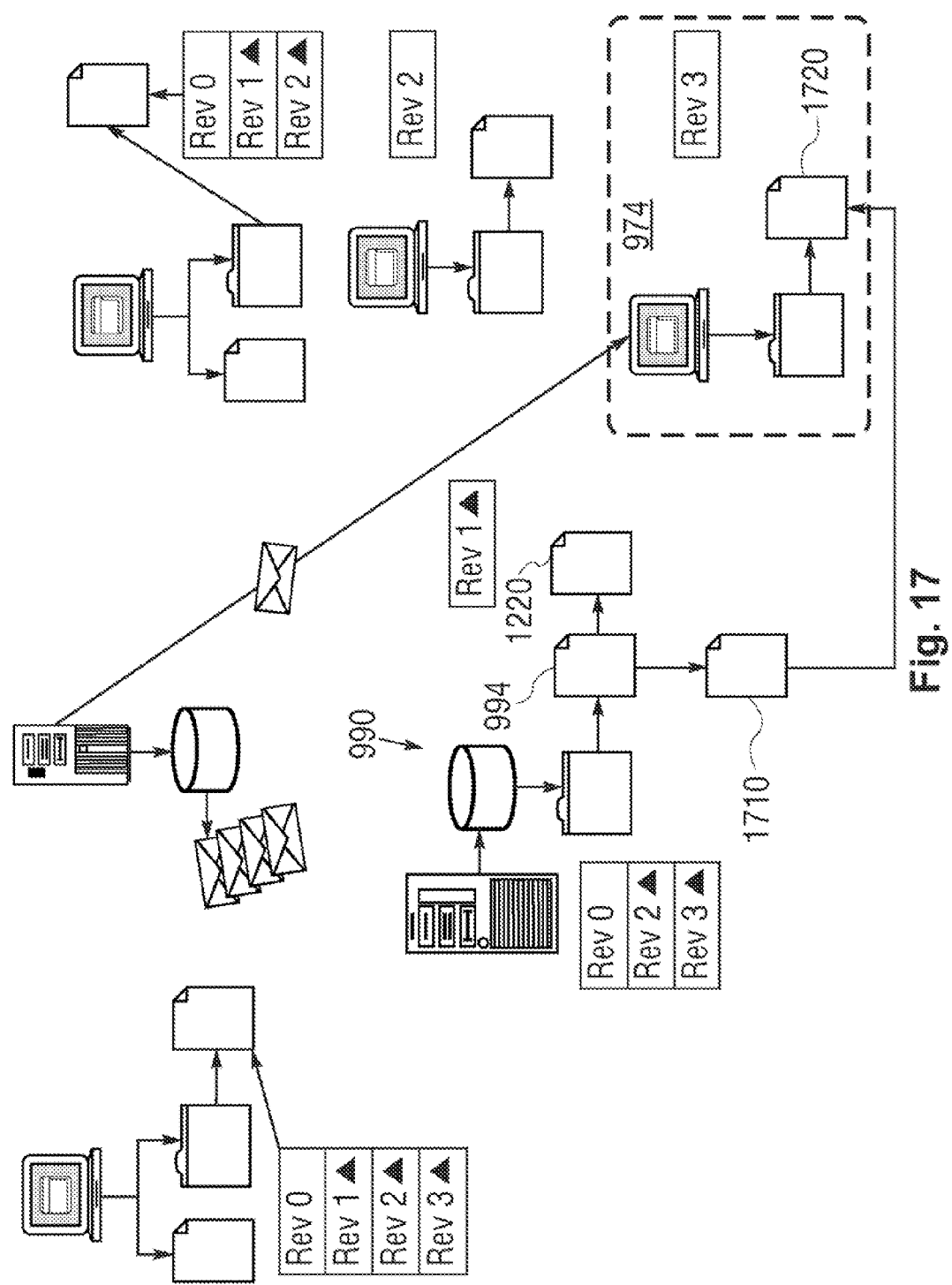

User A continues editing the file and, at process 918 (FIG. 16), transmits delta data 1605 representing "rev 3" of the file to server 990. Again, only delta data is necessary because server 990 has an immediately previous version of the file. Process 918 also transmits an e-mail message 1610 containing a reference to the new revision to computer 1630 of user C. Process 974 receives the message via a copy 1620 relayed by mail server 1040. As FIG. 17 illustrates, process 974 retrieves from server 990 data 1710 of the file's "rev 3" as updated. Server 990 constructs data 1710 from the "rev 2" state of the file based on contents of data set 994, which server 990 maintains for revisions from user A as discussed above.

Alternatively, server 990 can avoid maintaining copies of the file at various revisions by patching the original "rev 0" state of the file, as received from process 914 of FIG. 10 and stored in data set 994, with the "rev 1" delta data that is also stored in data set 1220, then patching the resulting "rev 1" state of the file with "rev 2" delta data in data set 994, then patching the resulting "rev 2" state of the file with the "rev 3" delta data, also in data set 994.

Process 974 writes copy 1710 of the file to a local file data set 1720. As may be better understood with reference to FIG. 18, user D then modifies the file through process 974, storing a local copy 1810 of the file at "rev 4" and transmitting delta data 1820 representing the differences of "rev 4" back to server 990. Server 990 writes the delta data to a data set 1830 that it begins maintaining for data from computer 1630 of user D. Process 974 transmits an e-mail message 1840 designating users A, B, and C as recipients of the file's "rev 4" to e-mail server 1040.

Figure 19:
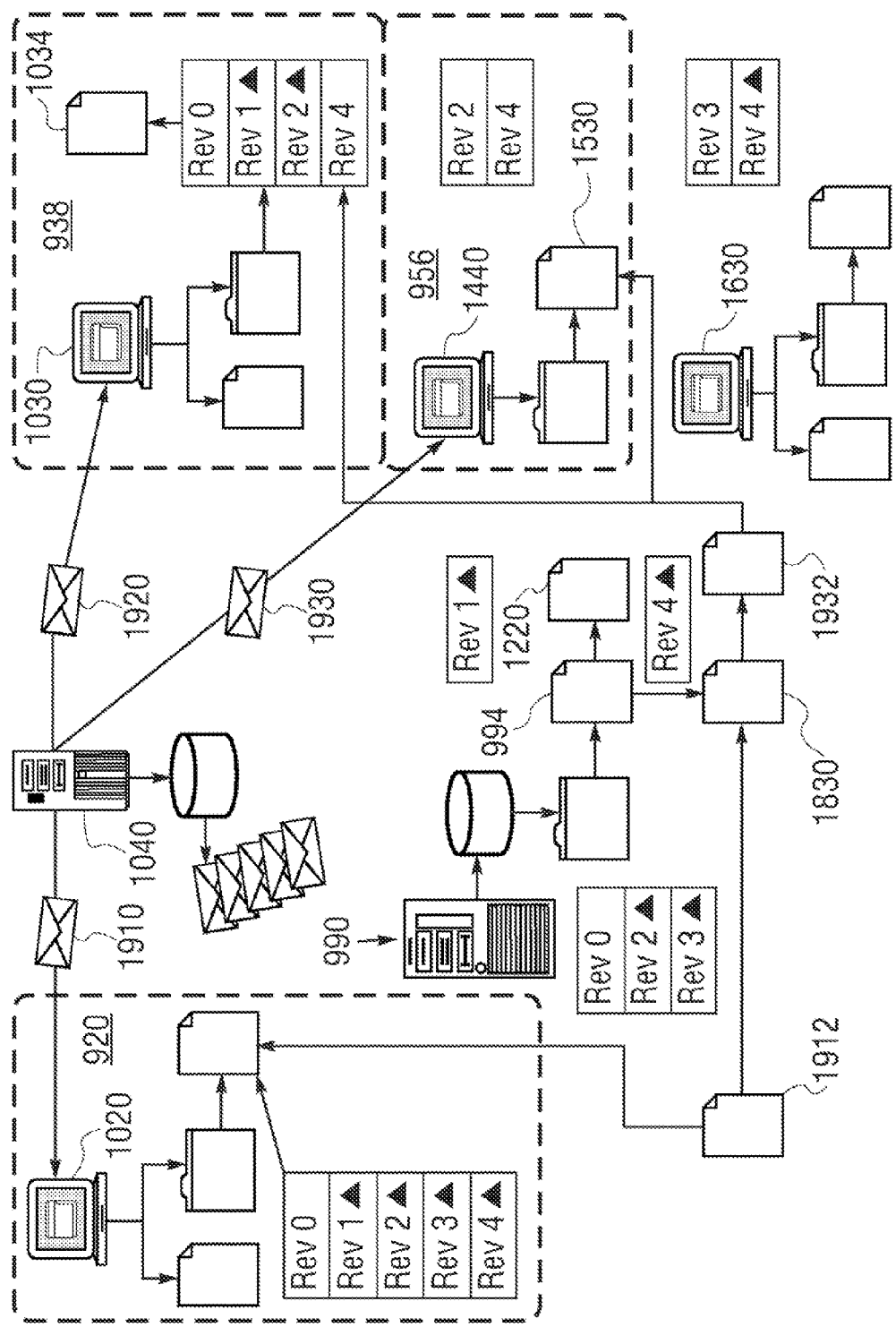

As illustrated in FIG. 19, e-mail server 1040 relays copies 1910, 1920, and 1930 of message 1840 to computers 1020, 1030, and 1440. User A's computer 1020 retrieves delta data 1912 from server 990. File data set 1024 includes "rev 3" of the file and thus only a delta from that revision to "rev 4" is necessary. User B's computer 1030 and user C's computer 1440 retrieve data 1932 of the file's full contents at "rev 4" because neither file data set 1034 of computer 1030 nor file data set 1530 of computer 1440 include the file at the immediately previous "rev 3."

Various desirable features of an electronic mail file access according to various aspects of the invention can be employed during method 900. Generally as discussed above with reference to FIG. 7, for example, delta data 1212 can consist substantially of indicia of differences between individual bytes of the file's revision zero and revision one contents. In other words, data 1212 need not include any data of substance (i.e., relating to the file contents) except such byte differences. An alternative, as generally discussed above with reference to FIG. 8, is for data 1212 to consists substantially of indicia of differences between individual blocks of the two file revisions' contents.

E-mail messages transmitted during operation of a collaborative file update system according to various aspects of the invention can advantageously include "Viewer" and "Editor" fields of the type discussed above with reference to FIGS. 4-5. When method 900 sends such messages, for example, message 1012 (FIG. 10) designates user B as an editor because user B is authorized to modify the file that message 1012 references, as evidenced by the file modification of process 934 (FIG. 13). Message 1410 (FIG. 14), which mail server 1040 relays as messages 1420, 1430 to users B and C, respectively, may designate user C as a mere viewer of the file because user C only views the file (during processes 954, 956 of FIGS. 9,14-15,19) and never modifies it.

In a method for facilitating collaborative updating of a file according to various aspects of the invention, data representing an initial version of the file is accepted from one of a plurality of users and stored. As discussed above with reference to exemplary method 900, server 990 (FIG. 10) accepts data 1010 representing an initial version of a file from user A's computer 1020. One or more recipients of the initial version is designated, for example user B having computer 1030 in method 900.

Figure 18:
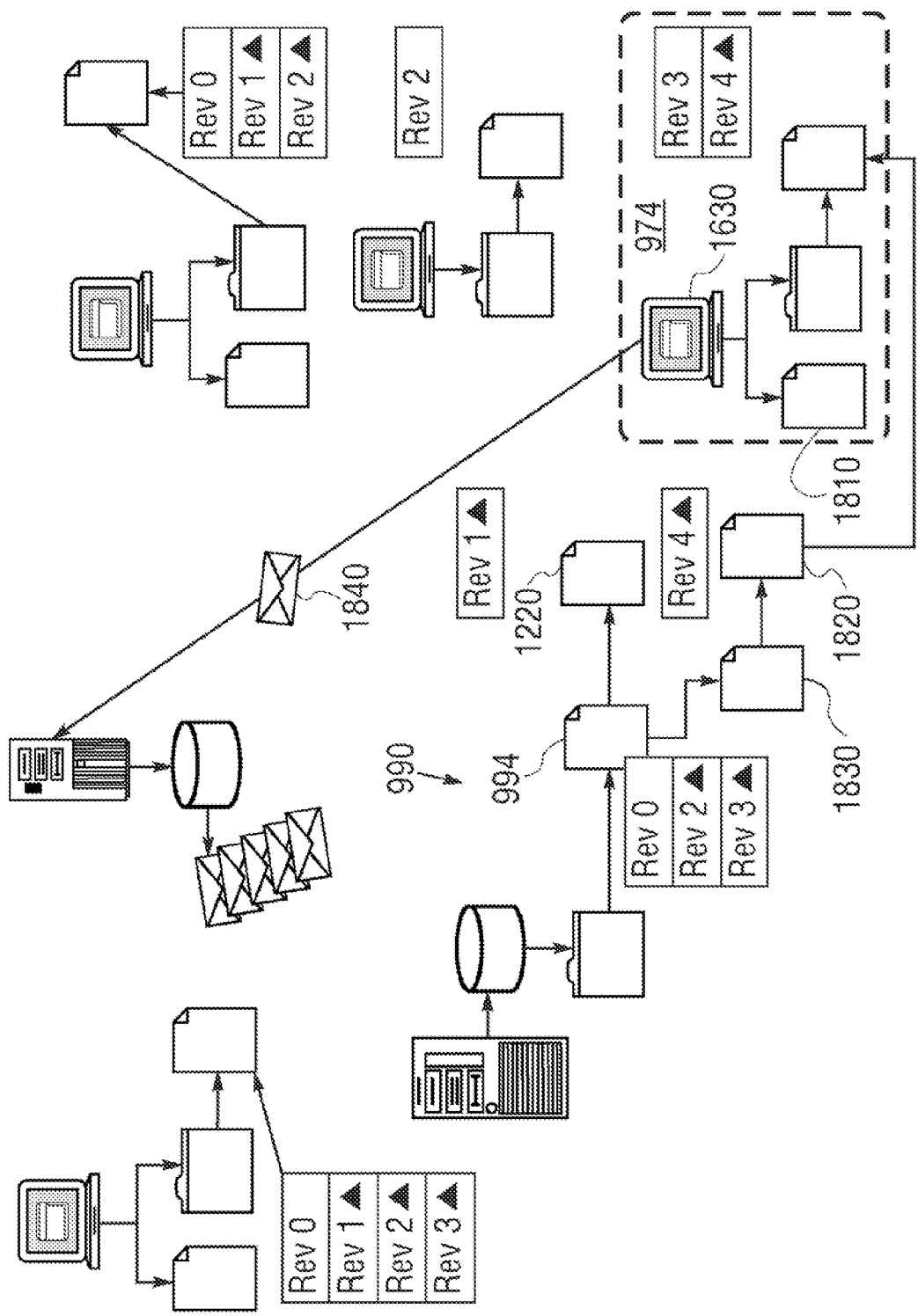

Then, for each one of a plurality of sequentially updated versions of the file, data is accepted, from one of the plurality of users, representative of the difference between the updated version of the file and the immediately previous version of the file. For example, server 990 accepts data 1210 (FIG. 12) representative of the difference between "rev 1" of the file as updated by user B and the immediately previous "rev 0" of the file originated by user A. One or more recipients of the updated version is designated, for example user A (designated via an e-mail message 1230) in process 934 of method 900 (FIG. 9). As another example, after sequentially updated versions "rev 2" and "rev 3," server 990 accepts data 1820 representative of a difference between an updated "rev 4" version of the file and an immediately previous "rev 3" from user D's computer 1630 (FIG. 18). In this example, e-mail message 1840, which e-mail server 1040 relays as messages 1910, 1920, and 1930 (FIG. 19), designates users A, B, and C as recipients of this updated version.

In the method, the data transmitted to each recipient designated as a recipient of the updated version and having accessed the immediately previous version consists substantially of the difference between the updated version of the file and the previous version of the file. At process 920 of method 900, for example, server 990 transmits only delta data 1912 (FIG. 19) to user A's computer 1020 because user A is designated as a recipient of the updated "rev 4" and was also designated as a recipient of the immediately previous "rev 3." Conversely, server 990 transmits data 1932 representing the file as updated to users B and C because those users did not access the immediately previous version of the file either as an originator or editor of that version, or as a designated recipient of that version.

The detailed description of preferred exemplary embodiments above mentions the detailed description portions of certain patents and publicly accessible patent applications, all of which are hereby incorporated herein by reference. The detailed description portions of all U.S. patents and patent applications incorporated by reference into these listed patents or applications are also specifically incorporated herein by reference.

PUBLIC NOTICE REGARDING THE SCOPE OF
THE INVENTION AND CLAIMS

The inventors consider various elements of the aspects and methods recited in the claims filed with the application as advantageous, perhaps even critical to certain implementations of the invention. However, the inventors regard no particular element as being "essential," except as set forth expressly in any particular claim.

While the invention has been described in terms of preferred embodiments and generally associated methods, the inventors contemplate that alterations and permutations of the preferred embodiments and methods will become apparent to those skilled in the art upon a reading of the specification and a study of the drawings.

Additional structure can be included, or additional processes performed, while still practicing various aspects of the invention claimed without reference to such structure or processes.

Accordingly, neither the above description of preferred exemplary embodiments nor the abstract defines or constrains the invention. Rather, the issued claims variously define the invention. Each variation of the invention is limited only by the recited limitations of its respective claim, and equivalents thereof, without limitation by other terms not present in the claim.

In addition, aspects of the invention are particularly pointed out in the claims using terminology that the inventors regard as having its broadest reasonable interpretation; the more specific interpretations of 35 U.S.C. §112(6) are only intended in those instances where the terms "means" or "steps" are actually recited.

The words "comprising," "including," and "having" are intended as open-ended terminology, with the same meaning as if the phrase "at least" were appended after each instance thereof. A clause using the term "whereby" merely states the result of the limitations in any claim in which it may appear and does not set forth an additional limitation therein. Both in the claims and in the description above, the conjunction "or" between alternative elements means "and/or," and thus does not imply that the elements are mutually exclusive unless context or a specific statement indicates otherwise.

What is claimed is:

1. A method for facilitating collaborative updating of a file, the method comprising:
   (a) accepting from one of a plurality of users, and storing, a first data set (i) representing a first version of the file and (ii) designating one or more recipients of the initial version; and
   (b) then, for each one of a plurality of sequentially updated versions of the file:
      (1) accepting, from one of the plurality of users, a second data set (i) including delta data indicating the difference between the updated version of the file and an immediately previous version of the file for constructing the updated version of the file from the immediately previous version of the file, and (ii) designating one or more recipients of the updated version; and
      (2) transmitting a third data set representative of the updated version of the file to at least one of the recipients of the updated version designated by the second data set;
   wherein
   (c) for each recipient designated by the second data set who accessed the immediately previous version of the file, the third data set includes the delta data indicating the difference between the updated version of the file and the previous version of the file.

2. The method of claim 1 further comprising, before accepting the first data set: (a) having one of the users originate an original version of the file; and (b) then accepting a plurality of sequentially updated versions of the file prior to the first version.

3. The method of claim 1 wherein for each recipient of the updated version who was not also designated as a recipient of the previous version, the third data set consists substantially of the file as updated.

4. The method of claim 1 further comprising storing the data sets as data files within a hierarchical structure of directories.

5. The method of claim 4 further comprising generating a plausibly unique identification code associated with the file, wherein each directory includes in its name at least a portion of the identification code.

6. The method of claim 5 wherein the identification code includes digits that are of a statistically uniform distribution.

7. The method of claim 4 further comprising, for each one of the plurality of users, generating a plausibly unique identification code associated with the user, wherein each data file includes in its name at least a portion of an identification code associated with one of the plurality of users.

8. The method of claim 1 wherein the delta data of the second data set includes data identifying bytes of the versions that differ.

9. The method of claim 1 wherein the delta data of the second data set includes data identifying blocks of the versions that differ.

10. The method of claim 1 further comprising: (a) providing a file server accessible to all of the plurality of users; and (b) having the file server accept and transmit the first second, and third data sets.

11. The method of claim 10 further comprising: (a) providing an e-mail server accessible to all of the plurality of users; and (b) having the e-mail server relay e-mail messages among the plurality of users, wherein the e-mail messages each include a reference by which designated recipients can retrieve a data set from the file server.

12. The method of claim 11 wherein the references are attachments that each contain code implementing a direct file access module.

13. The method of claim 11 wherein the e-mail messages each further include a message encoded data stream having a series of data frames, the frames comprising: (a) a message recipient frame; (b) a file viewer frame including a header; and (c) a file editor frame including a header; wherein (d) at least one of the viewer and editor frames include (1) for the viewer frame, data identifying a viewer authorized to view the file and (2) for the editor frame, data identifying an editor authorized to modify the file.

14. The method of claim 10 further comprising storing the data sets as data files within a hierarchical structure of directories.

15. The method of claim 14 further comprising generating a plausibly unique identification code associated with the file, wherein each directory includes in its name at least a portion of the identification code.

16. The method of claim 15 wherein the identification code includes digits that are of a statistically uniform distribution.

17. The method of claim 10 further comprising having the file server store data in a separate file data set for each one of the plurality of users.

18. The method of claim 17 further comprising, for each one of the plurality of users, generating a plausibly unique identification code associated with the user, wherein each file data set includes in its name at least a portion of an identification code associated with one of the plurality of users.

19. A computer-readable data storage medium comprising executable instructions operative, when executed, to cause one or more processors to perform a method for facilitating collaborative updating of a file, the method comprising:
   (a) accepting from one of a plurality of users, and storing, a first data set (i) representing a first version of the file and (ii) designating one or more recipients of the initial version; and (b) then, for each one of a plurality of sequentially updated versions of the file:
(1) accepting, from one of the plurality of users, a second data set (i) including delta data indicating the difference between the updated version of the file and an immediately previous version of the file for constructing the updated version of the file from the immediately previous version of the file, and (ii) designating one or more recipients of the updated version; and
(2) transmitting a third data set representative of the updated version of the file to at least one of the recipients of the updated version designated by the second data set;

wherein
(c) for each recipient designated by the second data set who accessed the immediately previous version of the file, the third data set includes the delta data indicating the difference between the updated version of the file and the previous version of the file.

20. The data storage medium of claim 19 wherein the method further comprises, before accepting the first data set, accepting a plurality of sequentially updated versions of the file prior to the first version.

21. The data storage medium of claim 19 wherein for each recipient of the updated version who was not also designated as a recipient of the previous version, the third data set consists substantially of the file as updated.

22. The data storage medium of claim 19 wherein the method further comprises storing the data sets as data files within a hierarchical structure of directories.

23. The data storage medium of claim 22 wherein the method further comprises generating a plausibly unique identification code associated with the file, wherein each directory includes in its name at least a portion of the identification code.

24. The data storage medium of claim 23 wherein the identification code includes digits that are of a statistically uniform distribution.

25. The data storage medium of claim 22 wherein the method further comprises, for each one of the plurality of users, generating a plausibly unique identification code associated with the user, wherein each data file includes in its name at least a portion of an identification code associated with one of the plurality of users.

26. The data storage medium of claim 19 wherein the delta data of the second data set includes data identifying bytes of the versions that differ.

27. The data storage medium of claim 19 wherein difference the delta data of the second data set includes data identifying blocks of the versions that differ.

28. The data storage medium of claim 19 wherein the method, executes on a file server accessible to all of the plurality of users and further comprises having the file server accept and transmit the first, second, and third data sets.

29. An apparatus, comprising:
a processor;
a memory;
instructions encoded in a computer-readable media for execution and when executed operable to:
(a) accept from one of a plurality of users, and store, a first data set (i) representing a first version of the file and (ii) designating one or more recipients of the initial version; and
(b) for each one of a plurality of sequentially updated versions of the file:
(1) accept, from one of the plurality of users, a second data set (i) including delta data indicating the difference between the updated version of the file and an immediately previous version of the file for constructing the updated version of the file from the immediately previous version of the file, and (ii) designating one or more recipients of the updated version; and
(2) transmit a third data set representative of the updated version of the file to at least one of the recipients of the updated version designated by the second data set;
(3) wherein for each recipient designated by the second data set who accessed the immediately previous version of the file, the third data set includes the delta data indicating the difference between the updated version of the file and the previous version of the file.

* * * * *